US012538083B2

(12) United States Patent
Zhang et al.

(10) Patent No.: US 12,538,083 B2
(45) Date of Patent: Jan. 27, 2026

(54) SYSTEMS AND METHODS FOR SUPPRESSING SOUND LEAKAGE

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 878 days.

(21) Appl. No.: 17/219,896

(22) Filed: Apr. 1, 2021

(65) Prior Publication Data

US 2021/0219074 A1 Jul. 15, 2021

Related U.S. Application Data

(63) Continuation-in-part of application No. 17/074,762, filed on Oct. 20, 2020, now Pat. No. 11,197,106,
(Continued)

(30) Foreign Application Priority Data

Jan. 6, 2014 (CN) ......................... 201410005804.0
Apr. 30, 2019 (CN) ......................... 201910364346.2
(Continued)

(51) Int. Cl.
*H04R 25/00* (2006.01)
*G10K 9/13* (2006.01)
(Continued)

(52) U.S. Cl.
CPC ............. *H04R 25/505* (2013.01); *G10K 9/13* (2013.01); *G10K 9/22* (2013.01); *G10K 11/175* (2013.01);
(Continued)

(58) Field of Classification Search
CPC ........ H04R 1/105; H04R 1/1075; H04R 1/20; H04R 1/26; H04R 1/32; H04R 1/323; H04R 1/34; H04R 1/345; H04R 1/347
See application file for complete search history.

(56) References Cited

U.S. PATENT DOCUMENTS 2,327,320 A 8/1943 Shapiro
4,987,597 A 1/1991 Haertl
(Continued)

FOREIGN PATENT DOCUMENTS

CN 201616895 U 10/2010
CN 201690580 U 12/2010
(Continued)

OTHER PUBLICATIONS

Notice of Preliminary Rejection in Korean Application No. 10-2022-7010046 mailed on Jun. 20, 2022, 15 pages.
(Continued)

*Primary Examiner* — Kile O Blair
(74) *Attorney, Agent, or Firm* — METIS IP LLC

(57) ABSTRACT

A speaker comprises a housing, a transducer residing inside the housing, and at least one sound guiding hole located on the housing. The transducer generates vibrations. The vibrations produce a sound wave inside the housing and cause a leaked sound wave spreading outside the housing from a portion of the housing. The at least one sound guiding hole guides the sound wave inside the housing through the at least one sound guiding hole to an outside of the housing. The guided sound wave interferes with the leaked sound wave in
(Continued)

a target region. The interference at a specific frequency relates to a distance between the at least one sound guiding hole and the portion of the housing.

20 Claims, 21 Drawing Sheets

Related U.S. Application Data which is a continuation-in-part of application No. 16/813,915, filed on Mar. 10, 2020, now Pat. No. 10,848,878, which is a continuation of application No. 16/419,049, filed on May 22, 2019, now Pat. No. 10,616,696, which is a continuation of application No. 16/180,020, filed on Nov. 5, 2018, now Pat. No. 10,334,372, which is a continuation of application No. 15/650,909, filed on Jul. 16, 2017, now Pat. No. 10,149,071, which is a continuation of application No. 15/109,831, filed as application No. PCT/CN2014/094065 on Dec. 17, 2014, now Pat. No. 9,729,978, application No. 17/219,896, filed on Apr. 1, 2021 is a continuation-in-part of application No. 17/169,468, filed on Feb. 7, 2021, now Pat. No. 11,540,038, which is a continuation of application No. PCT/CN2020/087034, filed on Apr. 26, 2020.

(30) Foreign Application Priority Data

Sep. 19, 2019 (CN) ........................ 201910888067.6
Sep. 19, 2019 (CN) ........................ 201910888762.2

(51) Int. Cl.

| | |
|---|---|
| ***G10K 9/22*** | (2006.01) |
| ***G10K 11/175*** | (2006.01) |
| ***G10K 11/178*** | (2006.01) |
| ***G10K 11/26*** | (2006.01) |
| ***H04R 1/28*** | (2006.01) |
| ***H04R 9/06*** | (2006.01) |
| *H04R 17/00* | (2006.01) |

(52) U.S. Cl.

CPC ............ *G10K 11/178* (2013.01); *G10K 11/26* (2013.01); *H04R 1/2811* (2013.01); *H04R 9/066* (2013.01); *G10K 2210/3216* (2013.01); *H04R 1/2876* (2013.01); *H04R 17/00* (2013.01); *H04R 2460/13* (2013.01)

(56) References Cited

U.S. PATENT DOCUMENTS

| | | | |
|---|---|---|---|
| 5,430,803 | A | 7/1995 | Kimura et al. |
| 5,692,059 | A | 11/1997 | Kruger |
| 5,757,935 | A | 5/1998 | Kang et al. |
| 5,790,684 | A | 8/1998 | Niino et al. |
| 6,478,108 | B1 | 11/2002 | Linhard et al. |
| 6,850,138 | B1 | 2/2005 | Sakai |
| 8,141,678 | B2 | 3/2012 | Ikeyama et al. |
| 9,226,075 | B2 | 12/2015 | Lee |
| 9,729,978 | B2 | 8/2017 | Qi et al. |
| 9,985,596 | B1 | 5/2018 | Litovsky et al. |
| 10,149,071 | B2 | 12/2018 | Qi et al. |
| 10,334,372 | B2 | 6/2019 | Qi et al. |
| 10,506,362 | B1 | 12/2019 | Gomes |
| 10,631,075 | B1 | 4/2020 | Patil et al. |
| 10,897,677 | B2 | 1/2021 | Walraevens et al. |
| 11,197,106 | B2 | 12/2021 | Qi et al. |
| 11,582,563 | B2 | 2/2023 | Qi et al. |
| 2003/0048913 | A1 | 3/2003 | Lee et al. |
| 2004/0131219 | A1 | 7/2004 | Polk, Jr. |
| 2005/0251952 | A1 | 11/2005 | Johnson |
| 2006/0094481 | A1 | 5/2006 | Gullickson |
| 2006/0098829 | A1 | 5/2006 | Kobayashi |
| 2007/0034493 | A1 | 2/2007 | Kawasaki et al. |
| 2007/0041595 | A1 | 2/2007 | Carazo et al. |
| 2007/0237341 | A1* | 10/2007 | Laroche .............. G10L 21/0332 381/94.2 |
| 2007/0274556 | A1 | 11/2007 | Matsumura et al. |
| 2008/0144874 | A1 | 6/2008 | Wu et al. |
| 2008/0287063 | A1 | 11/2008 | Kidron et al. |
| 2009/0095613 | A1 | 4/2009 | Lin |
| 2009/0127020 | A1 | 5/2009 | Connor |
| 2009/0141920 | A1 | 6/2009 | Suyama |
| 2009/0147981 | A1 | 6/2009 | Blanchard et al. |
| 2009/0190781 | A1 | 7/2009 | Fukuda |
| 2009/0208031 | A1 | 8/2009 | Abolfathi |
| 2009/0285417 | A1 | 11/2009 | Shin et al. |
| 2009/0290730 | A1 | 11/2009 | Fukuda et al. |
| 2009/0304209 | A1 | 12/2009 | Nakatani |
| 2010/0054492 | A1 | 3/2010 | Eaton et al. |
| 2010/0080400 | A1 | 4/2010 | Sibbald et al. |
| 2010/0322454 | A1 | 12/2010 | Ambrose et al. |
| 2011/0150262 | A1 | 6/2011 | Nakama et al. |
| 2012/0020501 | A1 | 1/2012 | Lee |
| 2012/0070022 | A1 | 3/2012 | Saiki |
| 2012/0177206 | A1 | 7/2012 | Yamagishi et al. |
| 2012/0201406 | A1 | 8/2012 | Yamaguchi |
| 2013/0188803 | A1 | 7/2013 | Shaanan et al. |
| 2013/0329919 | A1 | 12/2013 | He |
| 2014/0009008 | A1 | 1/2014 | Li et al. |
| 2014/0064533 | A1 | 3/2014 | Kasic, II |
| 2014/0185822 | A1 | 7/2014 | Kunimoto et al. |
| 2014/0185837 | A1 | 7/2014 | Kunimoto et al. |
| 2014/0274229 | A1 | 9/2014 | Fukuda |
| 2014/0294182 | A1 | 10/2014 | Axelsson et al. |
| 2014/0315605 | A1 | 10/2014 | Cho et al. |
| 2014/0355777 | A1 | 12/2014 | Nabata et al. |
| 2015/0003623 | A1 | 1/2015 | Rasmussen |
| 2015/0030189 | A1 | 1/2015 | Nabata et al. |
| 2015/0256656 | A1 | 9/2015 | Horii |
| 2015/0264473 | A1 | 9/2015 | Fukuda |
| 2015/0268673 | A1* | 9/2015 | Farzbod ................. H04R 5/033 700/280 |
| 2015/0326967 | A1 | 11/2015 | Otani |
| 2016/0037243 | A1 | 2/2016 | Lippert et al. |
| 2016/0037256 | A1 | 2/2016 | Katsuda et al. |
| 2016/0050474 | A1 | 2/2016 | Rye et al. |
| 2016/0150337 | A1 | 5/2016 | Nandy |
| 2016/0165357 | A1 | 6/2016 | Morishita et al. |
| 2016/0295328 | A1 | 10/2016 | Park |
| 2016/0329041 | A1 | 11/2016 | Qi et al. |
| 2017/0201823 | A1 | 7/2017 | Shetye et al. |
| 2017/0223445 | A1 | 8/2017 | Bullen et al. |
| 2017/0347192 | A1 | 11/2017 | Seo et al. |
| 2018/0167710 | A1 | 6/2018 | Silver et al. |
| 2018/0182370 | A1 | 6/2018 | Hyde et al. |
| 2019/0052954 | A1* | 2/2019 | Rusconi Clerici Beltrami ........... G10K 11/26 |
| 2019/0238971 | A1 | 8/2019 | Wakeland et al. |
| 2019/0320258 | A1* | 10/2019 | Ohura .................. H04R 1/2834 |
| 2020/0367008 | A1 | 11/2020 | Walsh et al. |
| 2021/0099027 | A1 | 4/2021 | Larsson et al. |
| 2021/0219059 | A1 | 7/2021 | Qi et al. |
| 2024/0276155 | A1 | 8/2024 | Li et al. |

FOREIGN PATENT DOCUMENTS

| | | | |
|---|---|---|---|
| CN | 102014328 | A | 4/2011 |
| CN | 102421043 | A | 4/2012 |
| CN | 202435600 | U | 9/2012 |
| CN | 103167390 | A | 6/2013 |
| CN | 103347235 | A | 10/2013 |
| CN | 204206450 | U | 3/2015 |
| CN | 107105363 | A | 8/2017 |
| CN | 109547888 | A | 3/2019 |
| CN | 209330353 | U | 8/2019 |
| EP | 2011367 | B1 | 12/2014 |
| JP | 2006332715 | A | 12/2006 |
| JP | 2007251358 | A | 9/2007 |

(56) References Cited

FOREIGN PATENT DOCUMENTS

| | | | |
|---|---|---|---|
| KR | 20050030183 | A | 3/2005 |
| KR | 20090082999 | A | 8/2009 |
| WO | 2004095878 | A2 | 11/2004 |
| WO | 2005053351 | A1 | 6/2005 |
| WO | 2021133679 | A1 | 7/2021 |

OTHER PUBLICATIONS

International Search Report in PCT/CN2014/094065 mailed on Mar. 17, 2015, 5 pages.
Written Opinion in PCT/CN2014/094065 mailed on Mar. 17, 2015, 10 pages.
First Office Action in Chinese Application No. 201410005804.0 mailed on Dec. 7, 2015, 9 pages.
Notice of Reasons for Refusal in Japanese Application No. 2016545828 mailed on Jun. 20, 2017, 10 pages.
The Extended European Search Report in European Application No. 14877111.6 mailed on Mar. 17, 2017, 6 pages.
First Examination Report in Indian Application No. 201617026062 mailed on Nov. 13, 2020, 6 pages.
International Search Report in PCT/CN2020/087034 mailed on Jul. 22, 2020, 4 pages.
Written Opinion in PCT/CN2020/087034 mailed on Jul. 22, 2020, 5 pages.

* cited by examiner

1500A

1500B

SYSTEMS AND METHODS FOR SUPPRESSING SOUND LEAKAGE

CROSS-REFERENCE TO RELATED APPLICATIONS

The present application is a continuation-in-part of U.S. patent application Ser. No. 17/074,762 filed on Oct. 20, 2020, which is a continuation-in-part of U.S. patent application Ser. No. 16/813,915 (now U.S. Pat. No. 10,848,878) filed on Mar. 10, 2020, which is a continuation of U.S. patent application Ser. No. 16/419,049 (now U.S. Pat. No. 10,616,696) filed on May 22, 2019, which is a continuation of U.S. patent application Ser. No. 16/180,020 (now U.S. Pat. No. 10,334,372) filed on Nov. 5, 2018, which is a continuation of U.S. patent application Ser. No. 15/650,909 (now U.S. Pat. No. 10,149,071) filed on Jul. 16, 2017, which is a continuation of U.S. patent application Ser. No. 15/109,831 (now U.S. Pat. No. 9,729,978) filed on Jul. 6, 2016, which is a U.S. National Stage entry under 35 U.S.C. § 371 of International Application No. PCT/CN2014/094065 filed on Dec. 17, 2014, designating the United States of America, which claims priority to Chinese Patent Application No. 201410005804.0, filed on Jan. 6, 2014; the present application is also a continuation-in-part of U.S. application Ser. No. 17/169,468 filed on Feb. 7, 2021, which is a continuation of International Application No. PCT/CN2020/087034 filed on Apr. 26, 2020, which claims priority of Chinese Patent Application No. 201910888067.6 filed on Sep. 19, 2019, Chinese Patent Application No. 201910888762.2 filed on Sep. 19, 2019, and Chinese Patent Application No. 201910364346.2 filed on Apr. 30, 2019. Each of the above-referenced applications is hereby incorporated by reference.

FIELD OF THE INVENTION

This application relates to a bone conduction device, and more specifically, relates to methods and systems for reducing sound leakage by a bone conduction device.

BACKGROUND

A bone conduction speaker, which may be also called a vibration speaker, may push human tissues and bones to stimulate the auditory nerve in cochlea and enable people to hear sound. The bone conduction speaker is also called a bone conduction headphone.

An exemplary structure of a bone conduction speaker based on the principle of the bone conduction speaker is shown in FIGS. 1A and 1B. The bone conduction speaker may include an open housing 110, a vibration board 121, a transducer 122, and a linking component 123. The transducer 122 may transduce electrical signals to mechanical vibrations. The vibration board 121 may be connected to the transducer 122 and vibrate synchronically with the transducer 122. The vibration board 121 may stretch out from the opening of the housing 110 and contact with human skin to pass vibrations to auditory nerves through human tissues and bones, which in turn enables people to hear sound. The linking component 123 may reside between the transducer 122 and the housing 110, configured to fix the vibrating transducer 122 inside the housing 110. To minimize its effect on the vibrations generated by the transducer 122, the linking component 123 may be made of an elastic material.

However, the mechanical vibrations generated by the transducer 122 may not only cause the vibration board 121 to vibrate, but may also cause the housing 110 to vibrate through the linking component 123. Accordingly, the mechanical vibrations generated by the bone conduction speaker may push human tissues through the bone board 121, and at the same time a portion of the vibrating board 121 and the housing 110 that are not in contact with human issues may nevertheless push air. Air sound may thus be generated by the air pushed by the portion of the vibrating board 121 and the housing 110. The air sound may be called "sound leakage." In some cases, sound leakage is harmless. However, sound leakage should be avoided as much as possible if people intend to protect privacy when using the bone conduction speaker or try not to disturb others when listening to music.

Attempting to solve the problem of sound leakage, Korean patent KR10-2009-0082999 discloses a bone conduction speaker of a dual magnetic structure and double-frame. As shown in FIG. 2, the speaker disclosed in the patent includes: a first frame 210 with an open upper portion and a second frame 220 that surrounds the outside of the first frame 210. The second frame 220 is separately placed from the outside of the first frame 210. The first frame 210 includes a movable coil 230 with electric signals, an inner magnetic component 240, an outer magnetic component 250, a magnet field formed between the inner magnetic component 240, and the outer magnetic component 250. The inner magnetic component 240 and the out magnetic component 250 may vibrate by the attraction and repulsion force of the coil 230 placed in the magnet field. A vibration board 260 connected to the moving coil 230 may receive the vibration of the moving coil 230. A vibration unit 270 connected to the vibration board 260 may pass the vibration to a user by contacting with the skin. As described in the patent, the second frame 220 surrounds the first frame 210, in order to use the second frame 220 to prevent the vibration of the first frame 210 from dissipating the vibration to outsides, and thus may reduce sound leakage to some extent.

However, in this design, since the second frame 220 is fixed to the first frame 210, vibrations of the second frame 220 are inevitable. As a result, sealing by the second frame 220 is unsatisfactory. Furthermore, the second frame 220 increases the whole volume and weight of the speaker, which in turn increases the cost, complicates the assembly process, and reduces the speaker's reliability and consistency.

SUMMARY

The embodiments of the present application disclose methods and system of reducing sound leakage of a bone conduction speaker.

In one aspect, the embodiments of the present application disclose a method of reducing sound leakage of a bone conduction speaker, including: providing a bone conduction speaker including a vibration board fitting human skin and passing vibrations, a transducer, and a housing, wherein at least one sound guiding hole is located in at least one portion of the housing; the transducer drives the vibration board to vibrate; the housing vibrates, along with the vibrations of the transducer, and pushes air, forming a leaked sound wave transmitted in the air; the air inside the housing is pushed out of the housing through the at least one sound guiding hole, interferes with the leaked sound wave, and reduces an amplitude of the leaked sound wave.

In some embodiments, one or more sound guiding holes may locate in an upper portion, a central portion, and/or a lower portion of a sidewall and/or the bottom of the housing.

In some embodiments, a damping layer may be applied in the at least one sound guiding hole in order to adjust the phase and amplitude of the guided sound wave through the at least one sound guiding hole.

In some embodiments, sound guiding holes may be configured to generate guided sound waves having a same phase that reduce the leaked sound wave having a same wavelength; sound guiding holes may be configured to generate guided sound waves having different phases that reduce the leaked sound waves having different wavelengths.

In some embodiments, different portions of a same sound guiding hole may be configured to generate guided sound waves having a same phase that reduce the leaked sound wave having same wavelength. In some embodiments, different portions of a same sound guiding hole may be configured to generate guided sound waves having different phases that reduce leaked sound waves having different wavelengths.

In another aspect, the embodiments of the present application disclose a bone conduction speaker, including a housing, a vibration board and a transducer, wherein: the transducer is configured to generate vibrations and is located inside the housing; the vibration board is configured to be in contact with skin and pass vibrations; at least one sound guiding hole may locate in at least one portion on the housing, and preferably, the at least one sound guiding hole may be configured to guide a sound wave inside the housing, resulted from vibrations of the air inside the housing, to the outside of the housing, the guided sound wave interfering with the leaked sound wave and reducing the amplitude thereof.

In some embodiments, the at least one sound guiding hole may locate in the sidewall and/or bottom of the housing.

In some embodiments, preferably, the at least one sound guiding sound hole may locate in the upper portion and/or lower portion of the sidewall of the housing.

In some embodiments, preferably, the sidewall of the housing is cylindrical and there are at least two sound guiding holes located in the sidewall of the housing, which are arranged evenly or unevenly in one or more circles. Alternatively, the housing may have a different shape.

In some embodiments, preferably, the sound guiding holes have different heights along the axial direction of the cylindrical sidewall.

In some embodiments, preferably, there are at least two sound guiding holes located in the bottom of the housing. In some embodiments, the sound guiding holes are distributed evenly or unevenly in one or more circles around the center of the bottom. Alternatively or additionally, one sound guiding hole is located at the center of the bottom of the housing.

In some embodiments, preferably, the sound guiding hole is a perforative hole. In some embodiments, there may be a damping layer at the opening of the sound guiding hole.

In some embodiments, preferably, the guided sound waves through different sound guiding holes and/or different portions of a same sound guiding hole have different phases or a same phase.

In some embodiments, preferably, the damping layer is a tuning paper, a tuning cotton, a nonwoven fabric, a silk, a cotton, a sponge, or a rubber.

In some embodiments, preferably, the shape of a sound guiding hole is circle, ellipse, quadrangle, rectangle, or linear. In some embodiments, the sound guiding holes may have a same shape or different shapes.

In some embodiments, preferably, the transducer includes a magnetic component and a voice coil. Alternatively, the transducer includes piezoelectric ceramic.

The design disclosed in this application utilizes the principles of sound interference, by placing sound guiding holes in the housing, to guide sound wave(s) inside the housing to the outside of the housing, the guided sound wave(s) interfering with the leaked sound wave, which is formed when the housing's vibrations push the air outside the housing. The guided sound wave(s) reduces the amplitude of the leaked sound wave and thus reduces the sound leakage. The design not only reduces sound leakage, but is also easy to implement, doesn't increase the volume or weight of the bone conduction speaker, and barely increase the cost of the product.

The meanings of the mark numbers in the figures are as followed:

110, open housing; 121, vibration board; 122, transducer; 123, linking component; 210, first frame; 220, second frame; 230, moving coil; 240, inner magnetic component; 250, outer magnetic component; 260; vibration board; 270, vibration unit; 10, housing; 11, sidewall; 12, bottom; 21, vibration board; 22, transducer; 23, linking component; 24, elastic component; 30, sound guiding hole.

DETAILED DESCRIPTION

Followings are some further detailed illustrations about this disclosure. The following examples are for illustrative purposes only and should not be interpreted as limitations of the claimed invention. There are a variety of alternative techniques and procedures available to those of ordinary skill in the art, which would similarly permit one to successfully perform the intended invention. In addition, the figures just show the structures relative to this disclosure, not the whole structure.

Figure 1A:
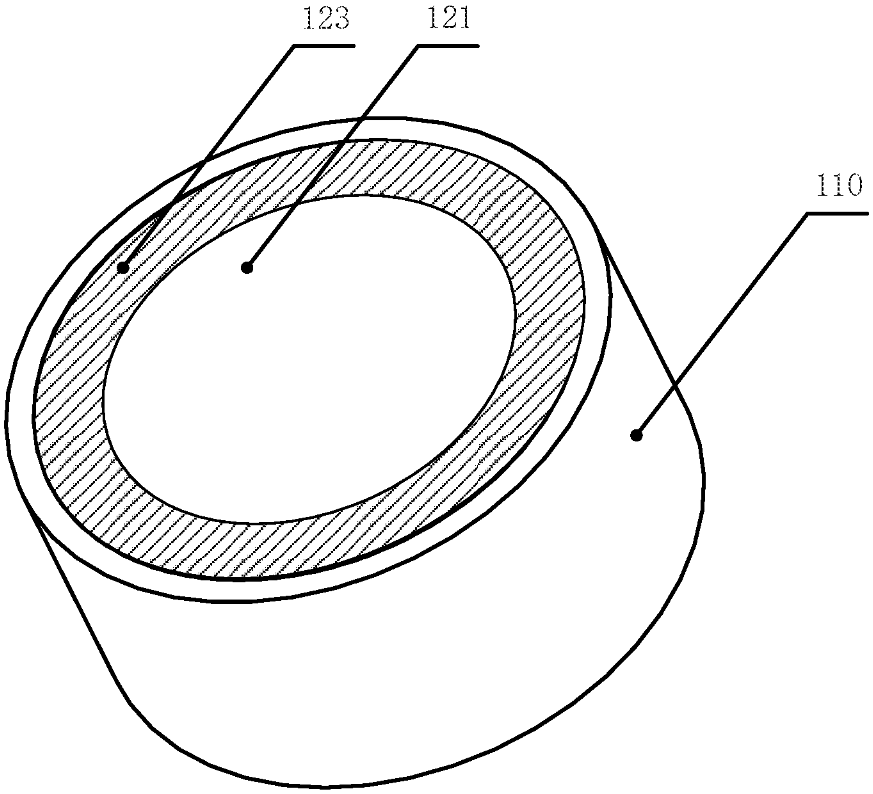
FIGS. 1A and 1B are schematic structures illustrating a bone conduction speaker of prior art.
Figure 1B:
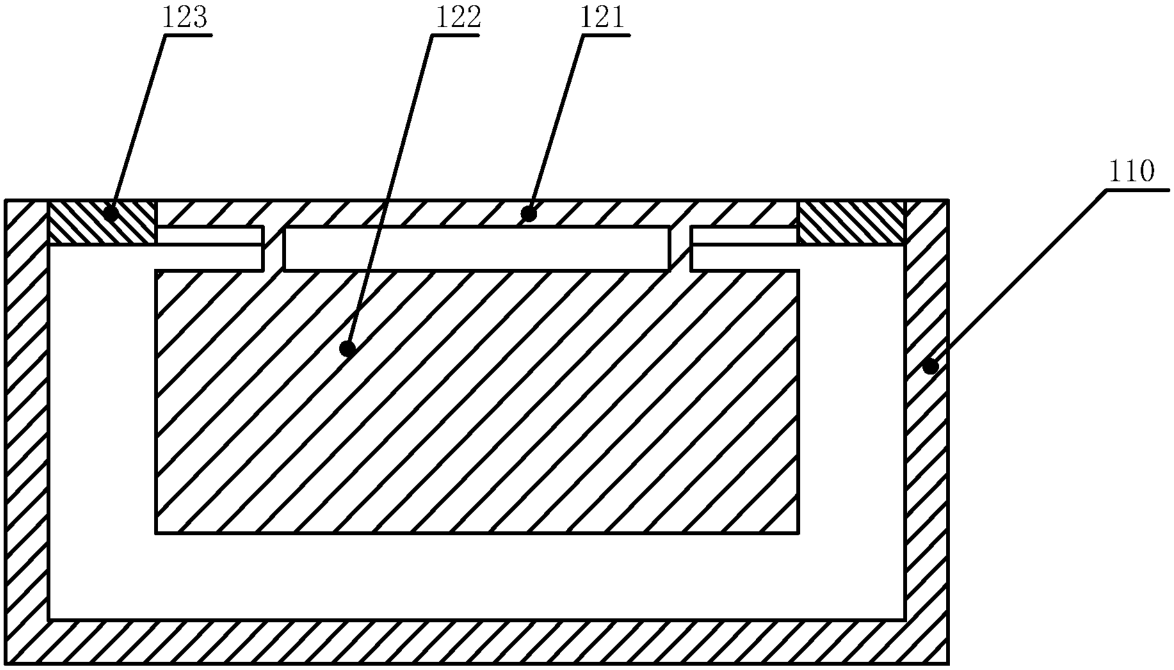
Figure 2:
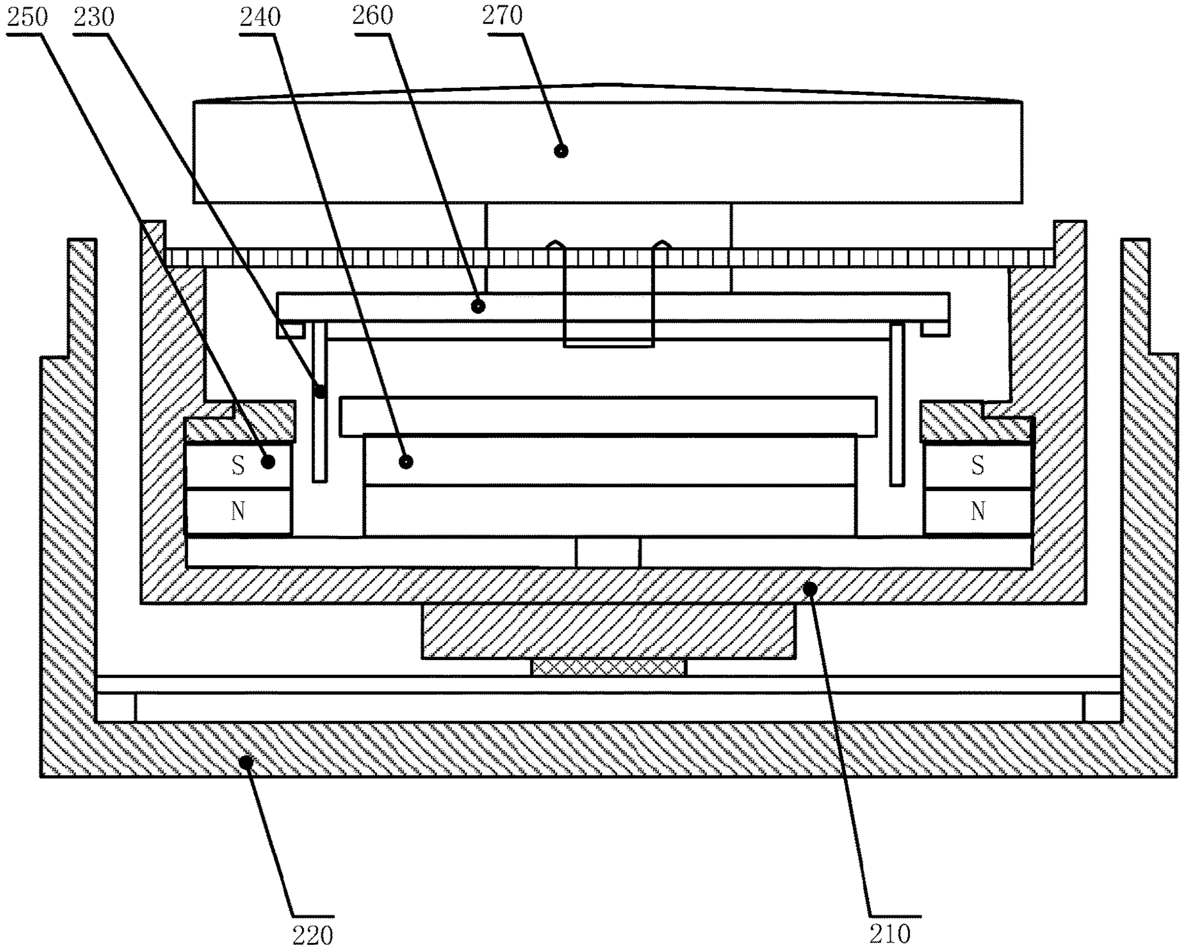
FIG. 2 is a schematic structure illustrating another bone conduction speaker of prior art.
Figure 3:
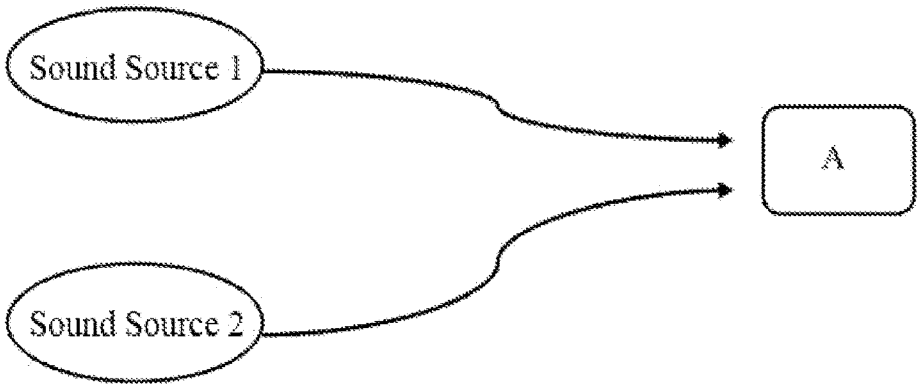
FIG. 3 illustrates the principle of sound interference according to some embodiments of the present disclosure.

To explain the scheme of the embodiments of this disclosure, the design principles of this disclosure will be introduced here. FIG. 3 illustrates the principles of sound interference according to some embodiments of the present disclosure. Two or more sound waves may interfere in the space based on, for example, the frequency and/or amplitude of the waves. Specifically, the amplitudes of the sound waves with the same frequency may be overlaid to generate a strengthened wave or a weakened wave. As shown in FIG. 3, sound source 1 and sound source 2 have the same frequency and locate in different locations in the space. The sound waves generated from these two sound sources may encounter in an arbitrary point A. If the phases of the sound wave 1 and sound wave 2 are the same at point A, the amplitudes of the two sound waves may be added, generating a strengthened sound wave signal at point A; on the other hand, if the phases of the two sound waves are opposite at point A, their amplitudes may be offset, generating a weakened sound wave signal at point A.

This disclosure applies above-noted the principles of sound wave interference to a bone conduction speaker and disclose a bone conduction speaker that can reduce sound leakage.

Embodiment One

Figure 4A:
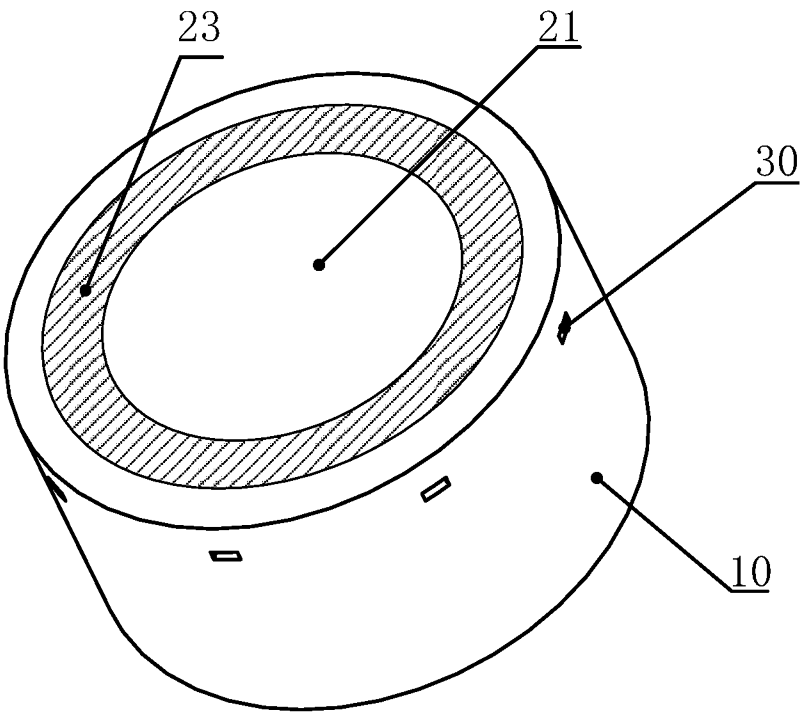
FIGS. 4A and 4B are schematic structures of an exemplary bone conduction speaker according to some embodiments of the present disclosure.
Figure 4B:
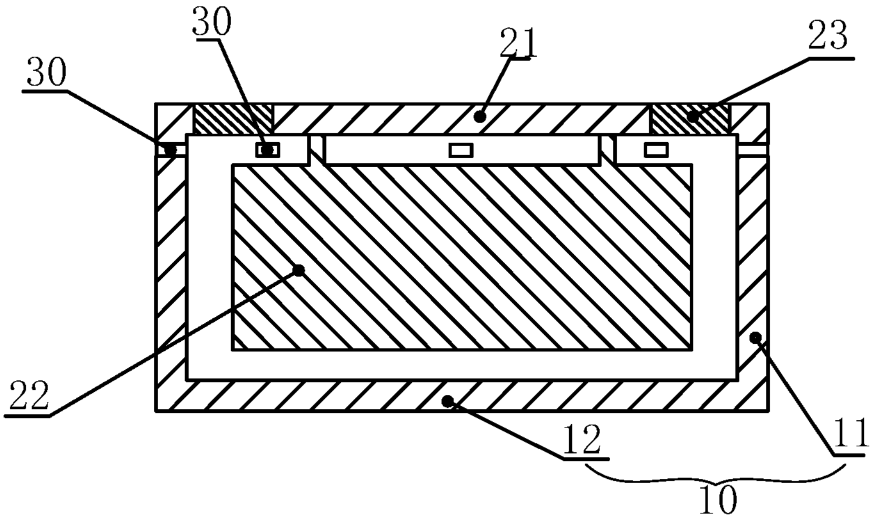

FIGS. 4A and 4B are schematic structures of an exemplary bone conduction speaker. The bone conduction speaker may include a housing 10, a vibration board 21, and a transducer 22. The transducer 22 may be inside the housing 10 and configured to generate vibrations. The housing 10 may have one or more sound guiding holes 30. The sound guiding hole(s) 30 may be configured to guide sound waves inside the housing 10 to the outside of the housing 10. In some embodiments, the guided sound waves may form interference with leaked sound waves generated by the vibrations of the housing 10, so as to reducing the amplitude of the leaked sound. The transducer 22 may be configured to convert an electrical signal to mechanical vibrations. For example, an audio electrical signal may be transmitted into a voice coil that is placed in a magnet, and the electromagnetic interaction may cause the voice coil to vibrate based on the audio electrical signal. As another example, the transducer 22 may include piezoelectric ceramics, shape changes of which may cause vibrations in accordance with electrical signals received.

Furthermore, the vibration board 21 may be connected to the transducer 22 and configured to vibrate along with the transducer 22. The vibration board 21 may stretch out from the opening of the housing 10, and touch the skin of the user and pass vibrations to auditory nerves through human tissues and bones, which in turn enables the user to hear sound. The linking component 23 may reside between the transducer 22 and the housing 10, configured to fix the vibrating transducer 122 inside the housing. The linking component 23 may include one or more separate components, or may be integrated with the transducer 22 or the housing 10. In some embodiments, the linking component 23 is made of an elastic material.

The transducer 22 may drive the vibration board 21 to vibrate. The transducer 22, which resides inside the housing 10, may vibrate. The vibrations of the transducer 22 may drives the air inside the housing 10 to vibrate, producing a sound wave inside the housing 10, which can be referred to as "sound wave inside the housing." Since the vibration board 21 and the transducer 22 are fixed to the housing 10 via the linking component 23, the vibrations may pass to the housing 10, causing the housing 10 to vibrate synchronously. The vibrations of the housing 10 may generate a leaked sound wave, which spreads outwards as sound leakage.

The sound wave inside the housing and the leaked sound wave are like the two sound sources in FIG. 3. In some embodiments, the sidewall 11 of the housing 10 may have one or more sound guiding holes 30 configured to guide the sound wave inside the housing 10 to the outside. The guided sound wave through the sound guiding hole(s) 30 may interfere with the leaked sound wave generated by the vibrations of the housing 10, and the amplitude of the leaked sound wave may be reduced due to the interference, which may result in a reduced sound leakage. Therefore, the design of this embodiment can solve the sound leakage problem to some extent by making an improvement of setting a sound guiding hole on the housing, and not increasing the volume and weight of the bone conduction speaker.

In some embodiments, one sound guiding hole 30 is set on the upper portion of the sidewall 11. As used herein, the upper portion of the sidewall 11 refers to the portion of the sidewall 11 starting from the top of the sidewall (contacting with the vibration board 21) to about the ⅓ height of the sidewall.

Figure 4C:
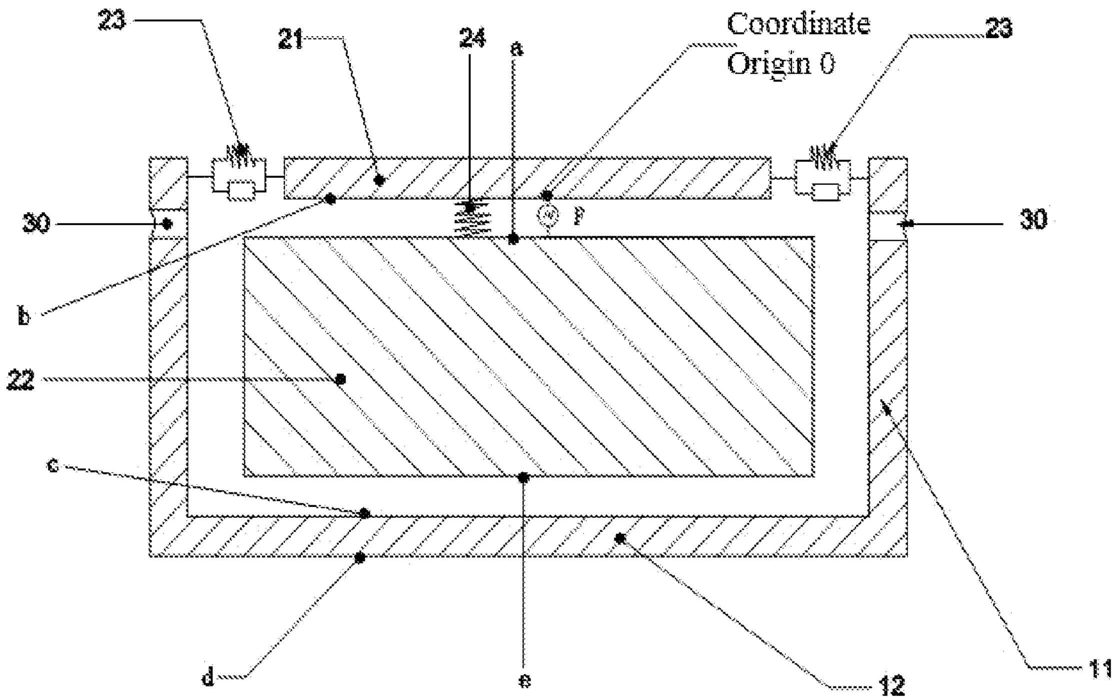
FIG. 4C is a schematic structure of the bone conduction speaker according to some embodiments of the present disclosure.

FIG. 4C is a schematic structure of the bone conduction speaker illustrated in FIGS. 4A-4B. The structure of the bone conduction speaker is further illustrated with mechanics elements illustrated in FIG. 4C. As shown in FIG. 4C, the linking component 23 between the sidewall 11 of the housing 10 and the vibration board 21 may be represented by an elastic element 23 and a damping element in the parallel connection. The linking relationship between the vibration board 21 and the transducer 22 may be represented by an elastic element 24.

Outside the housing 10, the sound leakage reduction is proportional to $$\left(\iint_{s_{hole}} P ds - \iint_{s_{housing}} P_d ds\right), \tag{1}$$

wherein $S_{hole}$ is the area of the opening of the sound guiding hole 30, $S_{housing}$ is the area of the housing 10 (e.g., the sidewall 11 and the bottom 12) that is not in contact with human face.

The pressure inside the housing may be expressed as $$P = P_a + P_b + P_c + P_e \tag{2}$$

wherein $P_a$, $P_b$, $P_c$ and $P_e$ are the sound pressures of an arbitrary point inside the housing 10 generated by side a, side b, side c and side e (as illustrated in FIG. 4C), respectively. As used herein, side a refers to the upper surface of the transducer 22 that is close to the vibration board 21, side b refers to the lower surface of the vibration board 21 that is close to the transducer 22, side c refers to the inner upper surface of the bottom 12 that is close to the transducer 22, and side e refers to the lower surface of the transducer 22 that is close to the bottom 12.

The center of the side b, O point, is set as the origin of the space coordinates, and the side b can be set as the z=0 plane, so $P_a$, $P_b$, $P_c$ and $P_e$ may be expressed as follows:

$$P_a(x, y, z) = -j\omega\rho_0 \iint_{S_a} W_a(x_a', y_a') \cdot \frac{e^{jkR(x_a', y_a')}}{4\pi R(x_a', y_a')} dx_a' dy_a' - P_{aR}, \tag{3}$$

$$P_b(x, y, z) = -j\omega\rho_0 \iint_{S_b} W_b(x', y') \cdot \frac{e^{jkR(x', y')}}{4\pi R(x', y')} dx' dy' - P_{bR}, \tag{4}$$

-continued $$P_c(x, y, z) = -j\omega\rho_0 \iint_{S_c} W_c(x_c', y_c') \cdot \frac{e^{jkR(x_c', y_c')}}{4\pi R(x_c', y_c')} dx_c' dy_c' - P_{cR}, \tag{5}$$

$$P_e(x, y, z) = -j\omega\rho_0 \iint_{S_e} W_e(x_e', y_e') \cdot \frac{e^{jkR(x_e', y_e')}}{4\pi R(x_e', y_e')} dx_e' dy_e' - P_{eR}, \tag{6}$$

wherein $$R(x', y') = \sqrt{(x - x')^2 + (y - y')^2 + z^2}$$

is the distance between an observation point (x, y, z) and a point on side b (x', y', 0); $S_a$, $S_b$, $S_c$ and $S_e$ are the areas of side a, side b, side c and side e, respectively;

$$R(x_a', y_a') = \sqrt{(x - x_a')^2 + (y - y_a')^2 + (z - z_a)^2}$$

is the distance between the observation point (x, y, z) and a point on side a ($x'_a$, $y'_a$, $z_a$);

$$R(x_c', y_c') = \sqrt{(x - x_c')^2 + (y - y_c')^2 + (z - z_c)^2}$$

is the distance between the observation point (x, y, z) and a point on side c ($x'_c$, $y'_c$, $z_c$);

$$R(x_e', y_e') = \sqrt{(x - x_e')^2 + (y - y_e')^2 + (z - z_e)^2}$$

is the distance between the observation point (x, y, z) and a point on side e ($x'_e$, $y'_e$, $z_e$);

k=ω/u(u is the velocity of sound) is wave number, $\rho_0$ is an air density, ω is an angular frequency of vibration.

$P_{aR}$, $P_{bR}$, $P_{cR}$ and $P_{eR}$ are acoustic resistances of air, which respectively are:

$$P_{aR} = A \cdot \frac{z_a \cdot r + j\omega \cdot z_a + r'}{\varphi} + \delta, \tag{7}$$

$$P_{bR} = A \cdot \frac{z_b \cdot r + j\omega \cdot z_b + r'}{\varphi} + \delta, \tag{8}$$

$$P_{cR} = A \cdot \frac{z_c \cdot r + j\omega \cdot z_c + r'}{\varphi} + \delta, \tag{9}$$

$$P_{eR} = A \cdot \frac{z_e \cdot r + j\omega \cdot z_e + r'}{\varphi} + \delta, \tag{10}$$

wherein r is the acoustic resistance per unit length, r' is the sound quality per unit length, $z_a$ is the distance between the observation point and side a, $z_b$ is the distance between the observation point and side b, $z_c$ is the distance between the observation point and side c, $z_e$ is the distance between the observation point and side e.

$W_a(x, y)$, $W_b(x, y)$, $W_c(x, y)$, $W_e(x, y)$ and $W_d(x, y)$ are the sound source power per unit area of side a, side b, side c, side e and side d, respectively, which can be derived from following formulas (11):

$$F_e = F_a = F - k_1 \cos \omega t - \iint_{s_a} W_a(x,y)dxdy - \iint_{s_e} W_e(x,y)dxdy - f,$$

$$F_b = -F + k_1 \cos \omega t + \iint_{s_b} W_b(x,y)dxdy - \iint_{s_e} W_e(x,y)dxdy - L,$$

$$F_c=F_d=F_b-k_2\cos\omega t-\iint_{s_c}W_c(x,y)dxdy-f-\gamma,$$

$$F_d=F_b-k_2\cos\omega t-\iint_{s_d}W_d(x,y)dxdy, \quad (11)$$

wherein F is the driving force generated by the transducer 22, $F_a$, $F_b$, $F_c$, $F_d$, and $F_e$ are the driving forces of side a, side b, side c, side d and side e, respectively. As used herein, side d is the outside surface of the bottom 12. $S_d$ is the region of side d, f is the viscous resistance formed in the small gap of the sidewalls, and $f=\eta\Delta s(dv/dy)$.

L is the equivalent load on human face when the vibration board acts on the human face, $\gamma$ is the energy dissipated on elastic element 24, $k_1$ and $k_2$ are the elastic coefficients of elastic element 23 and elastic element 24 respectively, $\eta$ is the fluid viscosity coefficient, dv/dy is the velocity gradient of fluid, $\Delta s$ is the cross-section area of a subject (board), A is the amplitude, $\varphi$ is the region of the sound field, and $\delta$ is a high order minimum (which is generated by the incompletely symmetrical shape of the housing).

The sound pressure of an arbitrary point outside the housing, generated by the vibration of the housing 10 is expressed as:

$$P_d=-j\omega\rho_0\int\int W_d(x'_d,y'_d)\cdot\frac{e^{jkR(x'_d,y'_d)}}{4\pi R(x'_d,y'_d)}dx'_d dy'_d, \quad (12)$$

wherein $$R(x'_d,y'_d)=\sqrt{(x-x'_d)^2+(y-y'_d)^2+(z-z_d)^2}$$

is the distance between the observation point (x, y, and z) and a point on side d ($x'_d$, $y'_d$, $z_d$).

$P_a$, $P_b$, $P_c$ and $P_e$ are functions of the position, when we set a hole on an arbitrary position in the housing, if the area of the hole is $S_{hole}$, the sound pressure of the hole is $\iint_{S_{hole}}$ Pds.

In the meanwhile, because the vibration board 21 fits human tissues tightly, the power it gives out is absorbed all by human tissues, so the only side that can push air outside the housing to vibrate is side d, thus forming sound leakage. As described elsewhere, the sound leakage is resulted from the vibrations of the housing 10. For illustrative purposes, the sound pressure generated by the housing 10 may be expressed as $\iint_{S_{housing}} P_d ds$.

The leaked sound wave and the guided sound wave interference may result in a weakened sound wave, i.e., to make $\iint_{S_{hole}}$ Pds and $\iint_{S_{housing}} P_d ds$ have the same value but opposite directions, and the sound leakage may be reduced. In some embodiments, $\iint_{S_{hole}}$ Pds may be adjusted to reduce the sound leakage. Since $\iint_{S_{hole}}$ Pds corresponds to information of phases and amplitudes of one or more holes, which further relates to dimensions of the housing of the bone conduction speaker, the vibration frequency of the transducer, the position, shape, quantity and/or size of the sound guiding holes and whether there is damping inside the holes. Thus, the position, shape, and quantity of sound guiding holes, and/or damping materials may be adjusted to reduce sound leakage.

According to the formulas above, a person having ordinary skill in the art would understand that the effectiveness of reducing sound leakage is related to the dimensions of the housing of the bone conduction speaker, the vibration frequency of the transducer, the position, shape, quantity and size of the sound guiding hole(s) and whether there is damping inside the sound guiding hole(s). Accordingly, various configurations, depending on specific needs, may be obtained by choosing specific position where the sound guiding hole(s) is located, the shape and/or quantity of the sound guiding hole(s) as well as the damping material.

Figure 5:
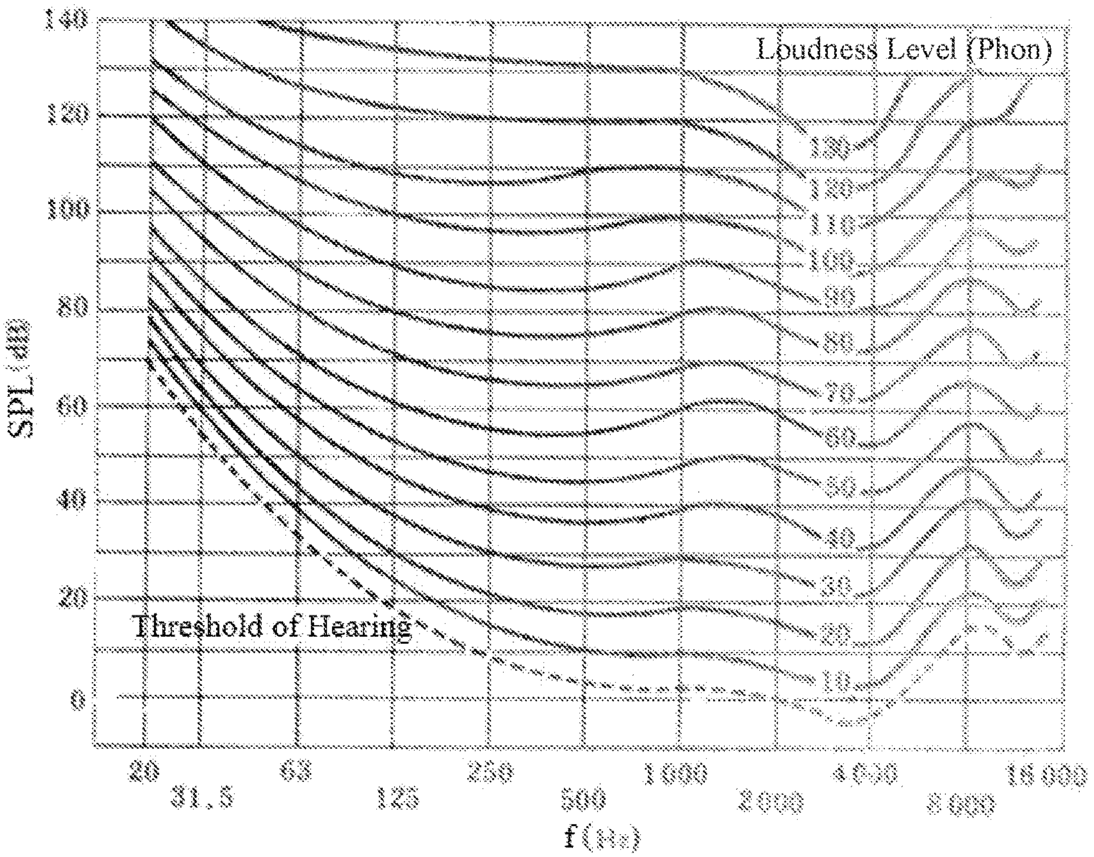
FIG. 5 is a diagram illustrating the equal-loudness contour curves according to some embodiments of the present disclosure.

FIG. 5 is a diagram illustrating the equal-loudness contour curves according to some embodiments of the present disclose. The horizontal coordinate is frequency, while the vertical coordinate is sound pressure level (SPL). As used herein, the SPL refers to the change of atmospheric pressure after being disturbed, i.e., a surplus pressure of the atmospheric pressure, which is equivalent to an atmospheric pressure added to a pressure change caused by the disturbance. As a result, the sound pressure may reflect the amplitude of a sound wave. In FIG. 5, on each curve, sound pressure levels corresponding to different frequencies are different, while the loudness levels felt by human ears are the same. For example, each curve is labeled with a number representing the loudness level of said curve. According to the loudness level curves, when volume (sound pressure amplitude) is lower, human ears are not sensitive to sounds of high or low frequencies; when volume is higher, human ears are more sensitive to sounds of high or low frequencies. Bone conduction speakers may generate sound relating to different frequency ranges, such as 1000 Hz~4000 Hz, or 1000 Hz~4000 Hz, or 1000 Hz~3500 Hz, or 1000 Hz~3000 Hz, or 1500 Hz~3000 Hz. The sound leakage within the above-mentioned frequency ranges may be the sound leakage aimed to be reduced with a priority.

Figure 4D:
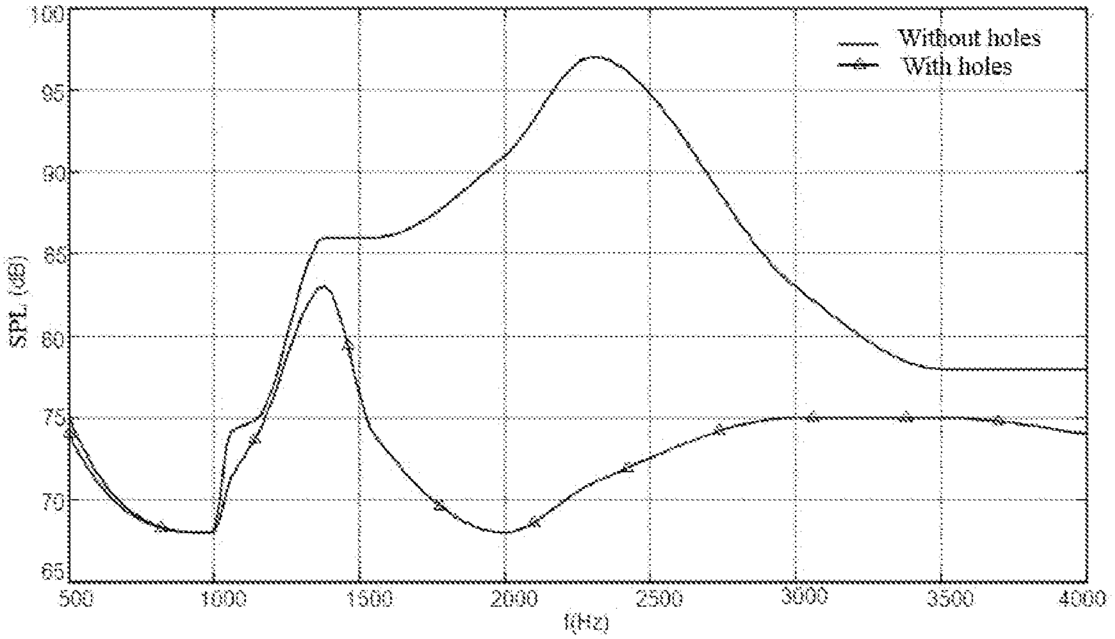
FIG. 4D is a diagram illustrating reduced sound leakage of the bone conduction speaker according to some embodiments of the present disclosure.

FIG. 4D is a diagram illustrating the effect of reduced sound leakage according to some embodiments of the present disclosure, wherein the test results and calculation results are close in the above range. The bone conduction speaker being tested includes a cylindrical housing, which includes a sidewall and a bottom, as described in FIGS. 4A and 4B. The cylindrical housing is in a cylinder shape having a radius of 22 mm, the sidewall height of 14 mm, and a plurality of sound guiding holes being set on the upper portion of the sidewall of the housing. The openings of the sound guiding holes are rectangle. The sound guiding holes are arranged evenly on the sidewall. The target region where the sound leakage is to be reduced is 50 cm away from the outside of the bottom of the housing. The distance of the leaked sound wave spreading to the target region and the distance of the sound wave spreading from the surface of the transducer 20 through the sound guiding holes 30 to the target region have a difference of about 180 degrees in phase. As shown, the leaked sound wave is reduced in the target region dramatically or even be eliminated.

According to the embodiments in this disclosure, the effectiveness of reducing sound leakage after setting sound guiding holes is very obvious. As shown in FIG. 4D, the bone conduction speaker having sound guiding holes greatly reduce the sound leakage compared to the bone conduction speaker without sound guiding holes.

In the tested frequency range, after setting sound guiding holes, the sound leakage is reduced by about 10 dB on average. Specifically, in the frequency range of 1500 Hz~3000 Hz, the sound leakage is reduced by over 10 dB. In the frequency range of 2000 Hz~2500 Hz, the sound leakage is reduced by over 20 dB compared to the scheme without sound guiding holes.

A person having ordinary skill in the art can understand from the above-mentioned formulas that when the dimensions of the bone conduction speaker, target regions to reduce sound leakage and frequencies of sound waves differ, the position, shape and quantity of sound guiding holes also need to adjust accordingly.

For example, in a cylinder housing, according to different needs, a plurality of sound guiding holes may be on the sidewall and/or the bottom of the housing. Preferably, the sound guiding hole may be set on the upper portion and/or lower portion of the sidewall of the housing. The quantity of the sound guiding holes set on the sidewall of the housing is no less than two. Preferably, the sound guiding holes may be arranged evenly or unevenly in one or more circles with respect to the center of the bottom. In some embodiments, the sound guiding holes may be arranged in at least one circle. In some embodiments, one sound guiding hole may be set on the bottom of the housing. In some embodiments, the sound guiding hole may be set at the center of the bottom of the housing.

The quantity of the sound guiding holes can be one or more. Preferably, multiple sound guiding holes may be set symmetrically on the housing. In some embodiments, there are 6-8 circularly arranged sound guiding holes.

The openings (and cross sections) of sound guiding holes may be circle, ellipse, rectangle, or slit. Slit generally means slit along with straight lines, curve lines, or arc lines. Different sound guiding holes in one bone conduction speaker may have same or different shapes.

A person having ordinary skill in the art can understand that, the sidewall of the housing may not be cylindrical, the sound guiding holes can be arranged asymmetrically as needed. Various configurations may be obtained by setting different combinations of the shape, quantity, and position of the sound guiding. Some other embodiments along with the figures are described as follows.

In some embodiments, the leaked sound wave may be generated by a portion of the housing 10. The portion of the housing may be the sidewall 11 of the housing 10 and/or the bottom 12 of the housing 10. Merely by way of example, the leaked sound wave may be generated by the bottom 12 of the housing 10. The guided sound wave output through the sound guiding hole(s) 30 may interfere with the leaked sound wave generated by the portion of the housing 10. The interference may enhance or reduce a sound pressure level of the guided sound wave and/or leaked sound wave in the target region.

In some embodiments, the portion of the housing 10 that generates the leaked sound wave may be regarded as a first sound source (e.g., the sound source 1 illustrated in FIG. 3), and the sound guiding hole(s) 30 or a part thereof may be regarded as a second sound source (e.g., the sound source 2 illustrated in FIG. 3). Merely for illustration purposes, if the size of the sound guiding hole on the housing 10 is small, the sound guiding hole may be approximately regarded as a point sound source. In some embodiments, any number or count of sound guiding holes provided on the housing 10 for outputting sound may be approximated as a single point sound source. Similarly, for simplicity, the portion of the housing 10 that generates the leaked sound wave may also be approximately regarded as a point sound source. In some embodiments, both the first sound source and the second sound source may approximately be regarded as point sound sources (also referred to as two-point sound sources).

Figure 4E:
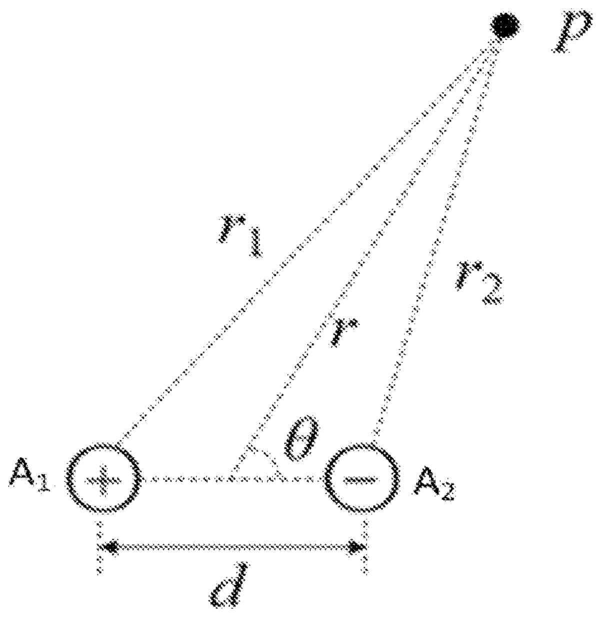
FIG. 4E is a schematic diagram illustrating exemplary two-point sound sources according to some embodiments of the present disclosure.

FIG. 4E is a schematic diagram illustrating exemplary two-point sound sources according to some embodiments of the present disclosure. The sound field pressure p generated by a single point sound source may satisfy Equation (13):

$$p = \frac{j\omega\rho_0}{4\pi r} Q_0 \exp j(\omega t - kr), \tag{13}$$

where ω denotes an angular frequency, $\rho_0$ denotes an air density, r denotes a distance between a target point and the sound source, $Q_0$ denotes a volume velocity of the sound source, and k denotes a wave number. It may be concluded that the magnitude of the sound field pressure of the sound field of the point sound source is inversely proportional to the distance to the point sound source.

It should be noted that, the sound guiding hole(s) for outputting sound as a point sound source may only serve as an explanation of the principle and effect of the present disclosure, and the shape and/or size of the sound guiding hole(s) may not be limited in practical applications. In some embodiments, if the area of the sound guiding hole is large, the sound guiding hole may also be equivalent to a planar sound source. Similarly, if an area of the portion of the housing 10 that generates the leaked sound wave is large (e.g., the portion of the housing 10 is a vibration surface or a sound radiation surface), the portion of the housing 10 may also be equivalent to a planar sound source. For those skilled in the art, without creative activities, it may be known that sounds generated by structures such as sound guiding holes, vibration surfaces, and sound radiation surfaces may be equivalent to point sound sources at the spatial scale discussed in the present disclosure, and may have consistent sound propagation characteristics and the same mathematical description method. Further, for those skilled in the art, without creative activities, it may be known that the acoustic effect achieved by the two-point sound sources may also be implemented by alternative acoustic structures. According to actual situations, the alternative acoustic structures may be modified and/or combined discretionarily, and the same acoustic output effect may be achieved.

The two-point sound sources may be formed such that the guided sound wave output from the sound guiding hole(s) may interfere with the leaked sound wave generated by the portion of the housing 10. The interference may reduce a sound pressure level of the leaked sound wave in the surrounding environment (e.g., the target region). For convenience, the sound waves output from an acoustic output device (e.g., the bone conduction speaker) to the surrounding environment may be referred to as far-field leakage since it may be heard by others in the environment. The sound waves output from the acoustic output device to the ears of the user may also be referred to as near-field sound since a distance between the bone conduction speaker and the user may be relatively short. In some embodiments, the sound waves output from the two-point sound sources may have a same frequency or frequency range (e.g., 800 Hz, 1000 Hz, 1500 Hz, 3000 Hz, etc.). In some embodiments, the sound waves output from the two-point sound sources may have a certain phase difference. In some embodiments, the sound guiding hole includes a damping layer. The damping layer may be, for example, a tuning paper, a tuning cotton, a nonwoven fabric, a silk, a cotton, a sponge, or a rubber. The damping layer may be configured to adjust the phase of the guided sound wave in the target region. The acoustic output device described herein may include a bone conduction speaker or an air conduction speaker. For example, a portion of the housing (e.g., the bottom of the housing) of the bone conduction speaker may be treated as one of the two-point sound sources, and at least one sound guiding holes of the bone conduction speaker may be treated as the other one of the two-point sound sources. As another example, one sound guiding hole of an air conduction speaker may be treated as one of the two-point sound sources, and another sound guiding hole of the air conduction speaker may be treated as the other one of the two-point sound sources. It should be noted that, although the construction of two-point sound sources may be different in bone conduction speaker and air conduction speaker, the principles of the interference between the various constructed two-point sound sources are the same. Thus, the equivalence of the two-point sound sources in a bone conduction speaker disclosed elsewhere in the present disclosure is also applicable for an air conduction speaker.

In some embodiments, when the position and phase difference of the two-point sound sources meet certain conditions, the acoustic output device may output different sound effects in the near field (for example, the position of the user's ear) and the far field. For example, if the phases of the point sound sources corresponding to the portion of the housing 10 and the sound guiding hole(s) are opposite, that is, an absolute value of the phase difference between the two-point sound sources is 180 degrees, the far-field leakage may be reduced according to the principle of reversed phase cancellation.

In some embodiments, the interference between the guided sound wave and the leaked sound wave at a specific frequency may relate to a distance between the sound guiding hole(s) and the portion of the housing 10. For example, if the sound guiding hole(s) are set at the upper portion of the sidewall of the housing 10 (as illustrated in FIG. 4A), the distance between the sound guiding hole(s) and the portion of the housing 10 may be large. Correspondingly, the frequencies of sound waves generated by such two-point sound sources may be in a mid-low frequency range (e.g., 1500-2000 Hz, 1500-2500 Hz, etc.). Referring to FIG. 4D, the interference may reduce the sound pressure level of the leaked sound wave in the mid-low frequency range (i.e., the sound leakage is low).

Merely by way of example, the low frequency range may refer to frequencies in a range below a first frequency threshold. The high frequency range may refer to frequencies in a range exceed a second frequency threshold. The first frequency threshold may be lower than the second frequency threshold. The mid-low frequency range may refer to frequencies in a range between the first frequency threshold and the second frequency threshold. For example, the first frequency threshold may be 1000 Hz, and the second frequency threshold may be 3000 Hz. The low frequency range may refer to frequencies in a range below 1000 Hz, the high frequency range may refer to frequencies in a range above 3000 Hz, and the mid-low frequency range may refer to frequencies in a range of 1000-2000 Hz, 1500-2500 Hz, etc. In some embodiments, a middle frequency range, a mid-high frequency range may also be determined between the first frequency threshold and the second frequency threshold. In some embodiments, the mid-low frequency range and the low frequency range may partially overlap. The mid-high frequency range and the high frequency range may partially overlap. For example, the mid-high frequency range may refer to frequencies in a range above 3000 Hz, and the mid-low frequency range may refer to frequencies in a range of 2800-3500 Hz. It should be noted that the low frequency range, the mid-low frequency range, the middle frequency range, the mid-high frequency range, and/or the high frequency range may be set flexibly according to different situations, and are not limited herein.

In some embodiments, the frequencies of the guided sound wave and the leaked sound wave may be set in a low frequency range (e.g., below 800 Hz, below 1200 Hz, etc.). In some embodiments, the amplitudes of the sound waves generated by the two-point sound sources may be set to be different in the low frequency range. For example, the amplitude of the guided sound wave may be smaller than the amplitude of the leaked sound wave. In this case, the interference may not reduce sound pressure of the near-field sound in the low-frequency range. The sound pressure of the near-field sound may be improved in the low-frequency range. The volume of the sound heard by the user may be improved.

In some embodiments, the amplitude of the guided sound wave may be adjusted by setting an acoustic resistance structure in the sound guiding hole(s) 30. The material of the acoustic resistance structure disposed in the sound guiding hole 30 may include, but not limited to, plastics (e.g., high-molecular polyethylene, blown nylon, engineering plastics, etc.), cotton, nylon, fiber (e.g., glass fiber, carbon fiber, boron fiber, graphite fiber, graphene fiber, silicon carbide fiber, or aramid fiber), other single or composite materials, other organic and/or inorganic materials, etc. The thickness of the acoustic resistance structure may be 0.005 mm, 0.01 mm, 0.02 mm, 0.5 mm, 1 mm, 2 mm, etc. The structure of the acoustic resistance structure may be in a shape adapted to the shape of the sound guiding hole. For example, the acoustic resistance structure may have a shape of a cylinder, a sphere, a cubic, etc. In some embodiments, the materials, thickness, and structures of the acoustic resistance structure may be modified and/or combined to obtain a desirable acoustic resistance structure. In some embodiments, the acoustic resistance structure may be implemented by the damping layer.

In some embodiments, the amplitude of the guided sound wave output from the sound guiding hole may be relatively low (e.g., zero or almost zero). The difference between the guided sound wave and the leaked sound wave may be maximized, thus achieving a relatively large sound pressure in the near field. In this case, the sound leakage of the acoustic output device having sound guiding holes may be almost the same as the sound leakage of the acoustic output device without sound guiding holes in the low frequency range (e.g., as shown in FIG. 4D).

Embodiment Two

Figure 6:
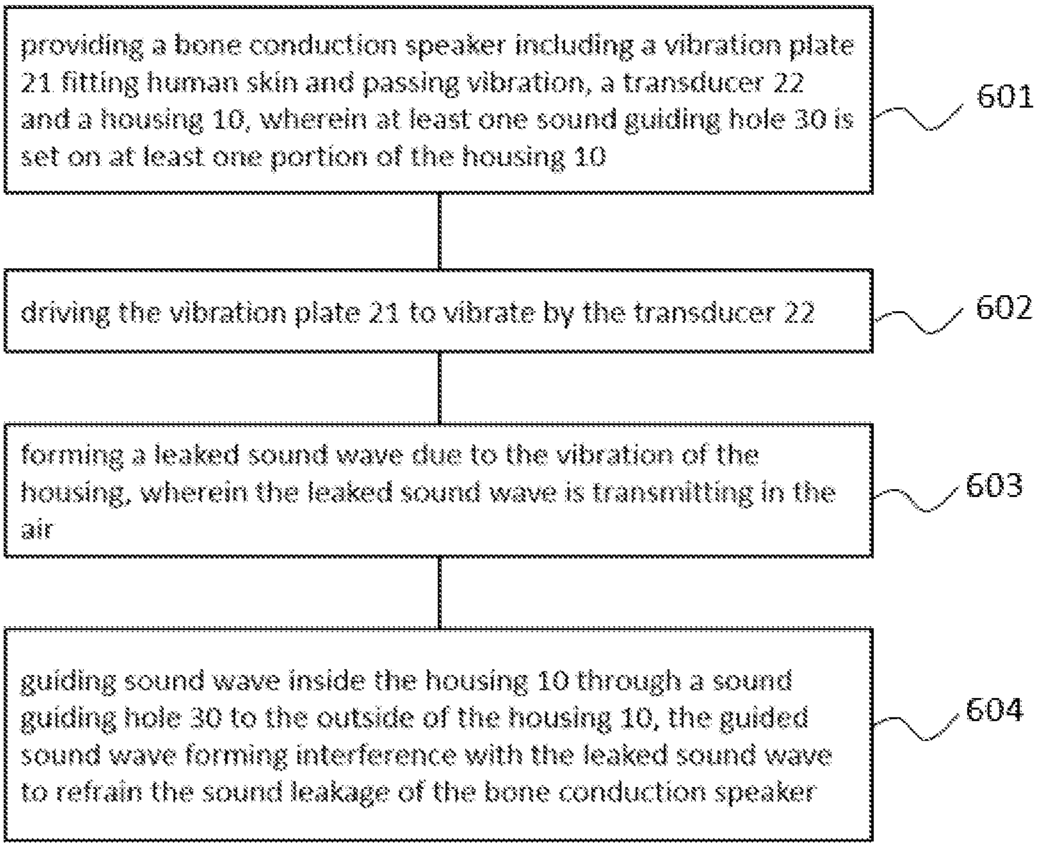
FIG. 6 is a flow chart of an exemplary method of reducing sound leakage of a bone conduction speaker according to some embodiments of the present disclosure.

FIG. 6 is a flowchart of an exemplary method of reducing sound leakage of a bone conduction speaker according to some embodiments of the present disclosure. At 601, a bone conduction speaker including a vibration plate 21 touching human skin and passing vibrations, a transducer 22, and a housing 10 is provided. At least one sound guiding hole 30 is arranged on the housing 10. At 602, the vibration plate 21 is driven by the transducer 22, causing the vibration 21 to vibrate. At 603, a leaked sound wave due to the vibrations of the housing is formed, wherein the leaked sound wave transmits in the air. At 604, a guided sound wave passing through the at least one sound guiding hole 30 from the inside to the outside of the housing 10. The guided sound wave interferes with the leaked sound wave, reducing the sound leakage of the bone conduction speaker.

The sound guiding holes 30 are preferably set at different positions of the housing 10.

The effectiveness of reducing sound leakage may be determined by the formulas and method as described above, based on which the positions of sound guiding holes may be determined.

A damping layer is preferably set in a sound guiding hole 30 to adjust the phase and amplitude of the sound wave transmitted through the sound guiding hole 30.

In some embodiments, different sound guiding holes may generate different sound waves having a same phase to reduce the leaked sound wave having the same wavelength. In some embodiments, different sound guiding holes may generate different sound waves having different phases to reduce the leaked sound waves having different wavelengths.

In some embodiments, different portions of a sound guiding hole 30 may be configured to generate sound waves having a same phase to reduce the leaked sound waves with the same wavelength. In some embodiments, different portions of a sound guiding hole 30 may be configured to generate sound waves having different phases to reduce the leaked sound waves with different wavelengths.

Additionally, the sound wave inside the housing may be processed to basically have the same value but opposite phases with the leaked sound wave, so that the sound leakage may be further reduced.

Embodiment Three

Figure 7A:
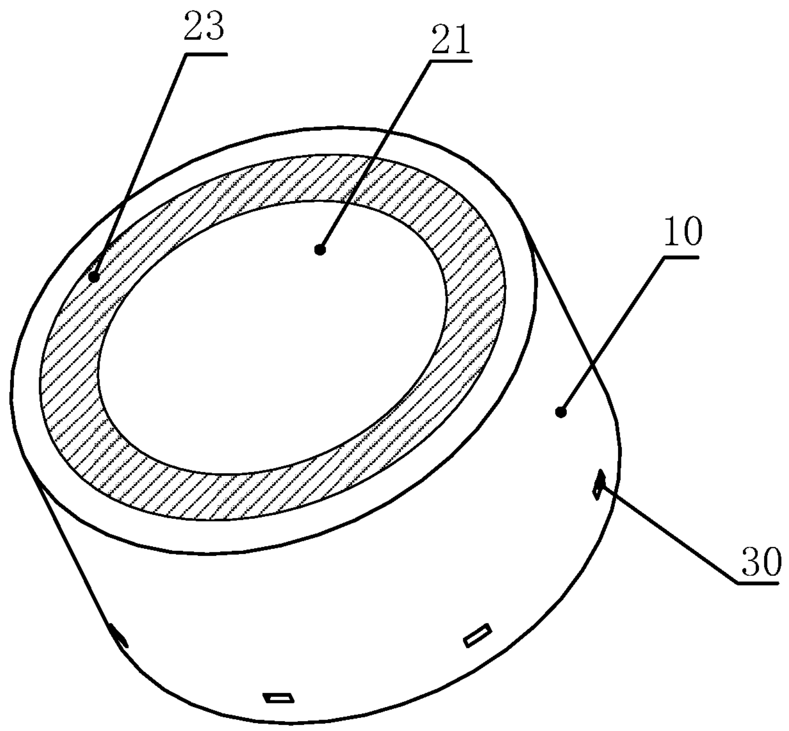
FIGS. 7A and 7B are schematic structures of an exemplary bone conduction speaker according to some embodiments of the present disclosure.
Figure 7B:
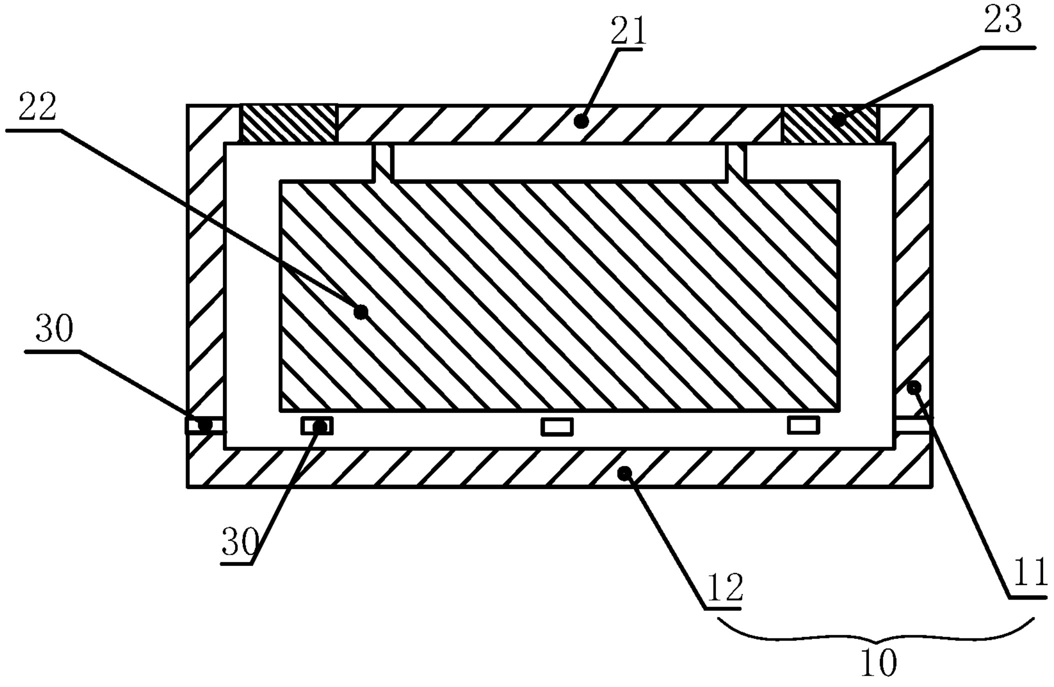

FIGS. 7A and 7B are schematic structures illustrating an exemplary bone conduction speaker according to some embodiments of the present disclosure. The bone conduction speaker may include an open housing 10, a vibration board 21, and a transducer 22. The housing 10 may cylindrical and have a sidewall and a bottom. A plurality of sound guiding holes 30 may be arranged on the lower portion of the sidewall (i.e., from about the ⅔ height of the sidewall to the bottom). The quantity of the sound guiding holes 30 may be 8, the openings of the sound guiding holes 30 may be rectangle. The sound guiding holes 30 may be arranged evenly or evenly in one or more circles on the sidewall of the housing 10.

In the embodiment, the transducer 22 is preferably implemented based on the principle of electromagnetic transduction. The transducer may include components such as magnetizer, voice coil, and etc., and the components may locate inside the housing and may generate synchronous vibrations with a same frequency.

Figure 7C:
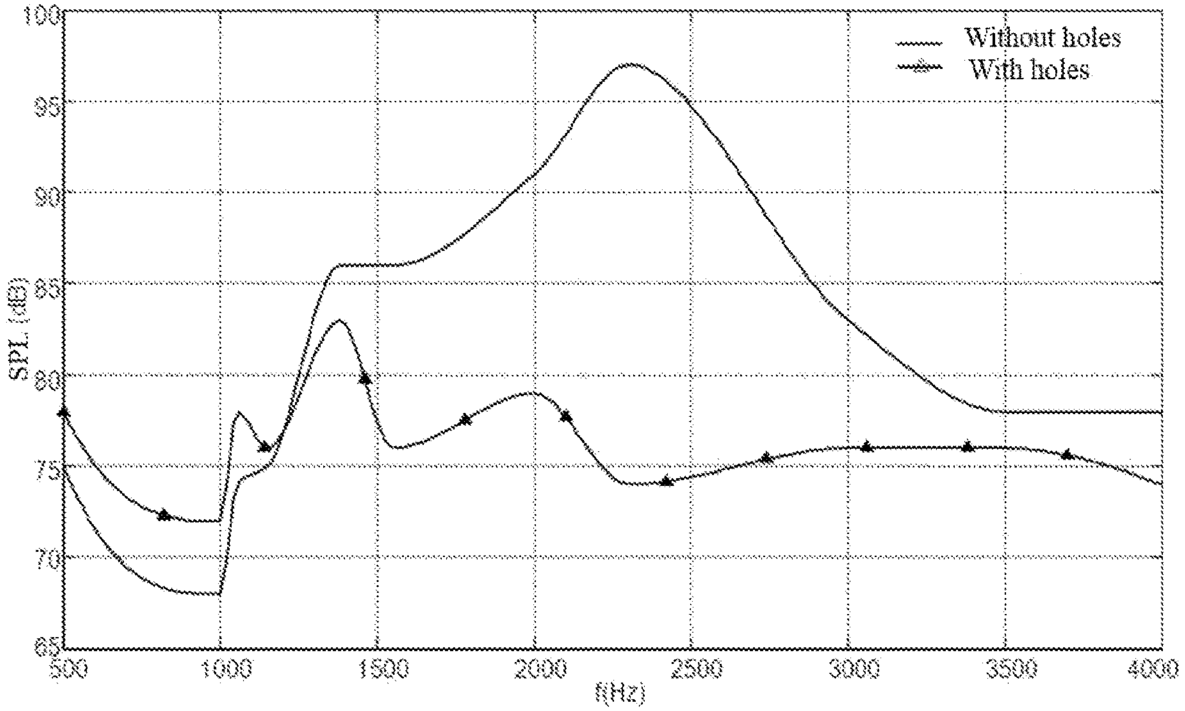
FIG. 7C is a diagram illustrating reduced sound leakage of a bone conduction speaker according to some embodiments of the present disclosure.

FIG. 7C is a diagram illustrating reduced sound leakage according to some embodiments of the present disclosure. In the frequency range of 1400 Hz~4000 Hz, the sound leakage is reduced by more than 5 dB, and in the frequency range of 2250 Hz~2500 Hz, the sound leakage is reduced by more than 20 dB.

In some embodiments, the sound guiding hole(s) at the lower portion of the sidewall of the housing 10 may also be approximately regarded as a point sound source. In some embodiments, the sound guiding hole(s) at the lower portion of the sidewall of the housing 10 and the portion of the housing 10 that generates the leaked sound wave may constitute two-point sound sources. The two-point sound sources may be formed such that the guided sound wave output from the sound guiding hole(s) at the lower portion of the sidewall of the housing 10 may interfere with the leaked sound wave generated by the portion of the housing 10. The interference may reduce a sound pressure level of the leaked sound wave in the surrounding environment (e.g., the target region) at a specific frequency or frequency range.

In some embodiments, the sound waves output from the two-point sound sources may have a same frequency or frequency range (e.g., 1000 Hz, 2500 Hz, 3000 Hz, etc.). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced.

In some embodiments, the interference between the guided sound wave and the leaked sound wave may relate to frequencies of the guided sound wave and the leaked sound wave and/or a distance between the sound guiding hole(s) and the portion of the housing 10. For example, if the sound guiding hole(s) are set at the lower portion of the sidewall of the housing 10 (as illustrated in FIG. 7A), the distance between the sound guiding hole(s) and the portion of the housing 10 may be small. Correspondingly, the frequencies of sound waves generated by such two-point sound sources may be in a high frequency range (e.g., above 3000 Hz, above 3500 Hz, etc.). Referring to FIG. 7C, the interference may reduce the sound pressure level of the leaked sound wave in the high frequency range.

Embodiment Four

Figure 8A:
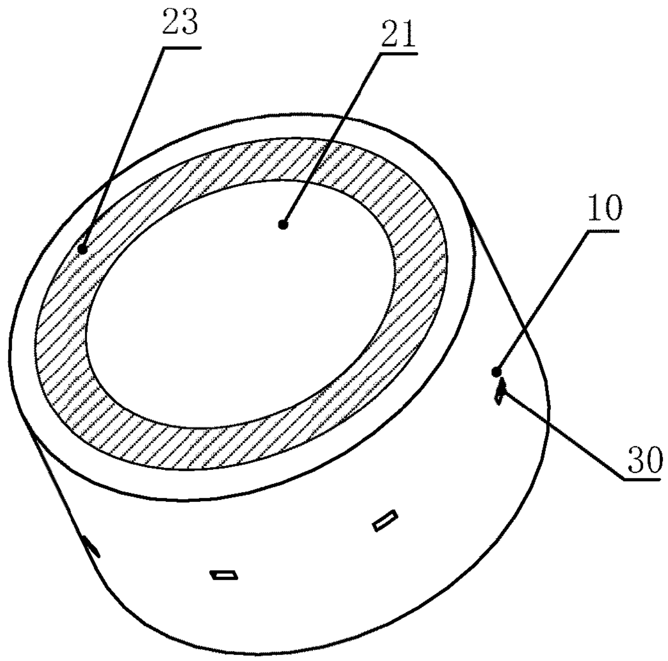
FIGS. 8A and 8B are schematic structure of an exemplary bone conduction speaker according to some embodiments of the present disclosure.
Figure 8B:
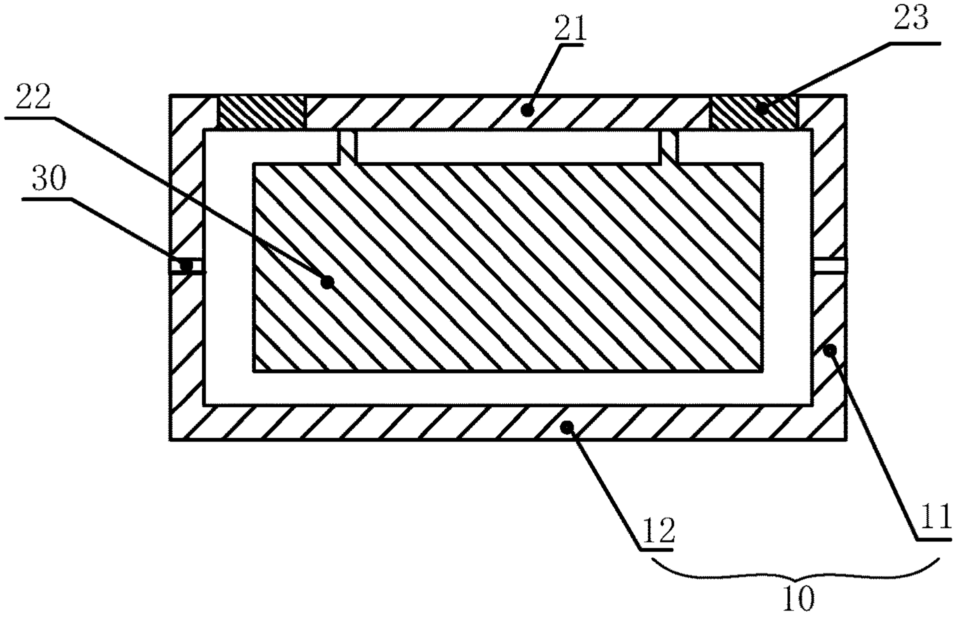

FIGS. 8A and 8B are schematic structures illustrating an exemplary bone conduction speaker according to some embodiments of the present disclosure. The bone conduction speaker may include an open housing 10, a vibration board 21, and a transducer 22. The housing 10 is cylindrical and have a sidewall and a bottom. The sound guiding holes 30 may be arranged on the central portion of the sidewall of the housing (i.e., from about the ⅓ height of the sidewall to the ⅔ height of the sidewall). The quantity of the sound guiding holes 30 may be 8, and the openings (and cross sections) of the sound guiding hole 30 may be rectangle. The sound guiding holes 30 may be arranged evenly or unevenly in one or more circles on the sidewall of the housing 10.

In the embodiment, the transducer 21 may be implemented preferably based on the principle of electromagnetic transduction. The transducer 21 may include components such as magnetizer, voice coil, etc., which may be placed inside the housing and may generate synchronous vibrations with the same frequency.

Figure 8C:
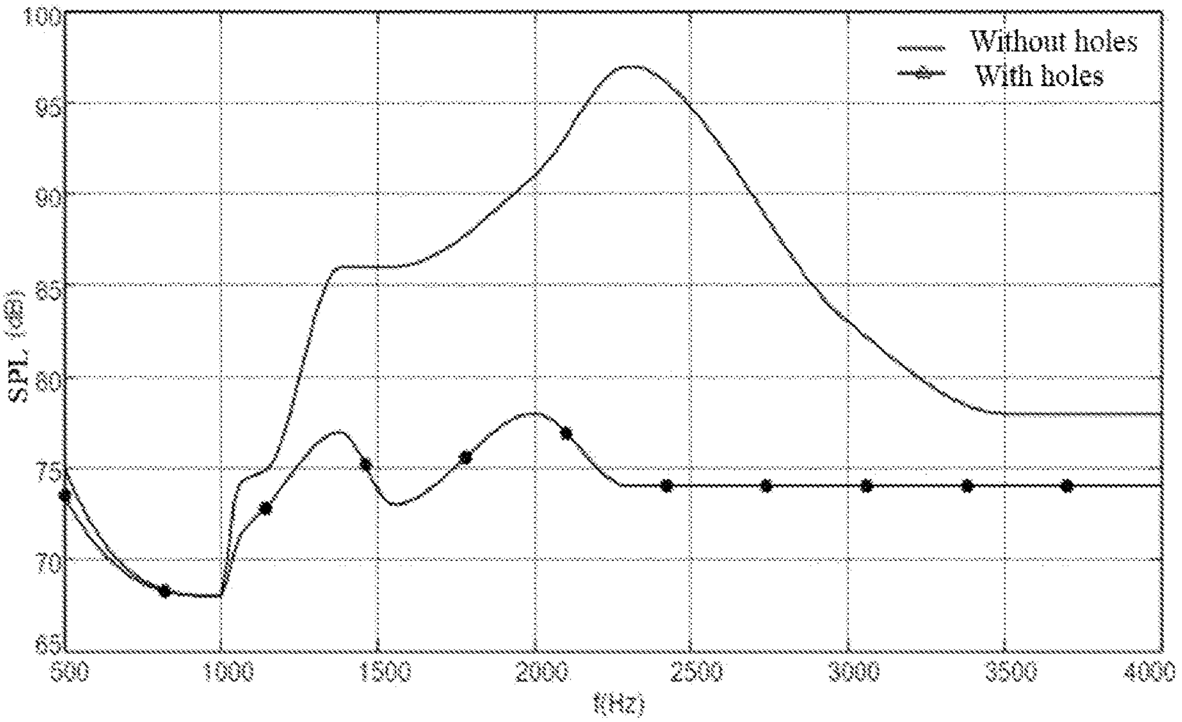
FIG. 8C is a diagram illustrating reduced sound leakage of a bone conduction speaker according to some embodiments of the present disclosure.

FIG. 8C is a diagram illustrating reduced sound leakage. In the frequency range of 1000 Hz~4000 Hz, the effectiveness of reducing sound leakage is great. For example, in the frequency range of 1400 Hz~2900 Hz, the sound leakage is reduced by more than 10 dB; in the frequency range of 2200 Hz~2500 Hz, the sound leakage is reduced by more than 20 dB.

It's illustrated that the effectiveness of reduced sound leakage can be adjusted by changing the positions of the sound guiding holes, while keeping other parameters relating to the sound guiding holes unchanged.

Embodiment Five

Figure 9A:
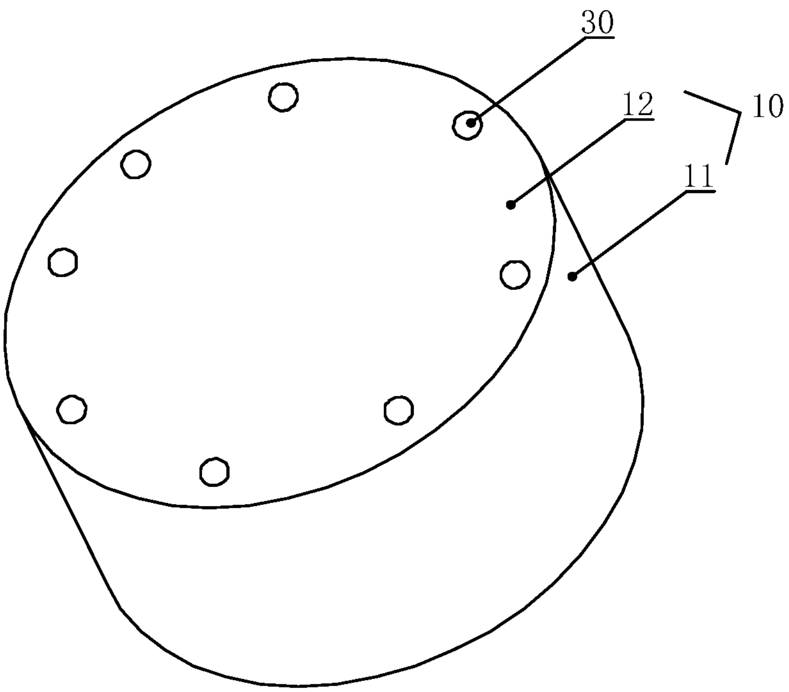
FIGS. 9A and 9B are schematic structures of an exemplary bone conduction speaker according to some embodiments of the present disclosure.
Figure 9B:
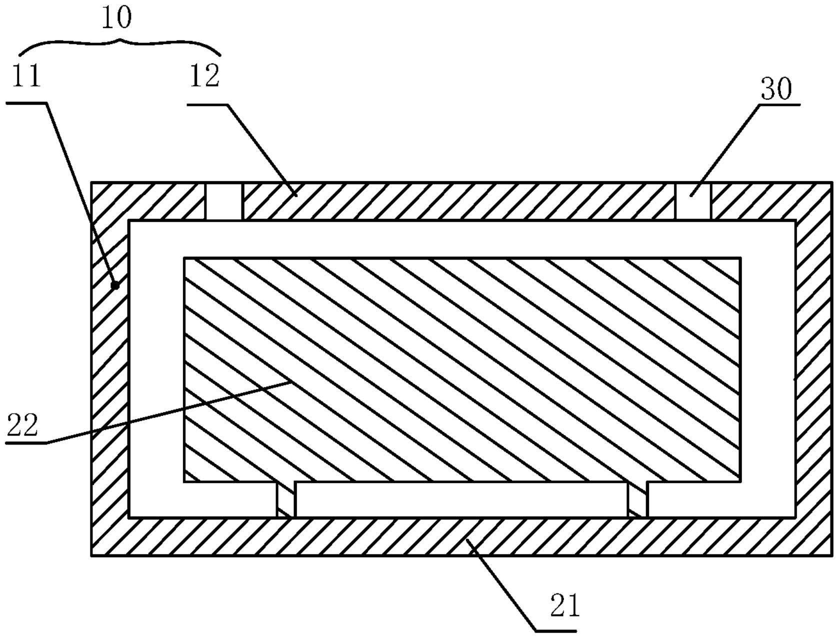

FIGS. 9A and 9B are schematic structures of an exemplary bone conduction speaker according to some embodiments of the present disclosure. The bone conduction speaker may include an open housing 10, a vibration board 21 and a transducer 22. The housing 10 is cylindrical, with a sidewall and a bottom. One or more perforative sound guiding holes 30 may be along the circumference of the bottom. In some embodiments, there may be 8 sound guiding holes 30 arranged evenly of unevenly in one or more circles on the bottom of the housing 10. In some embodiments, the shape of one or more of the sound guiding holes 30 may be rectangle.

In the embodiment, the transducer 21 may be implemented preferably based on the principle of electromagnetic transduction. The transducer 21 may include components such as magnetizer, voice coil, etc., which may be placed inside the housing and may generate synchronous vibration with the same frequency.

Figure 9C:
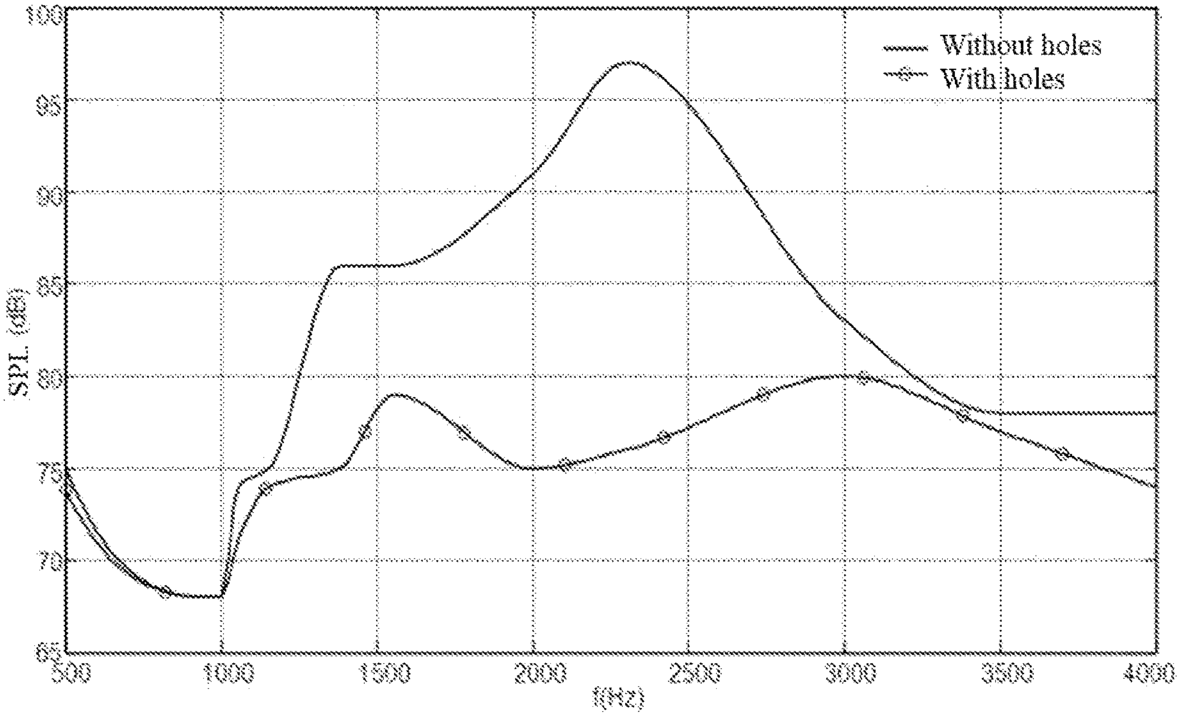
FIG. 9C is a diagram illustrating reduced sound leakage of a bone conduction speaker according to some embodiments of the present disclosure.

FIG. 9C is a diagram illustrating the effect of reduced sound leakage. In the frequency range of 1000 Hz-3000 Hz, the effectiveness of reducing sound leakage is outstanding. For example, in the frequency range of 1400 Hz-2700 Hz, the sound leakage is reduced by more than 10 dB; in the frequency range of 2200 Hz-2400 Hz, the sound leakage is reduced by more than 20 dB.

Embodiment Six

Figure 10A:
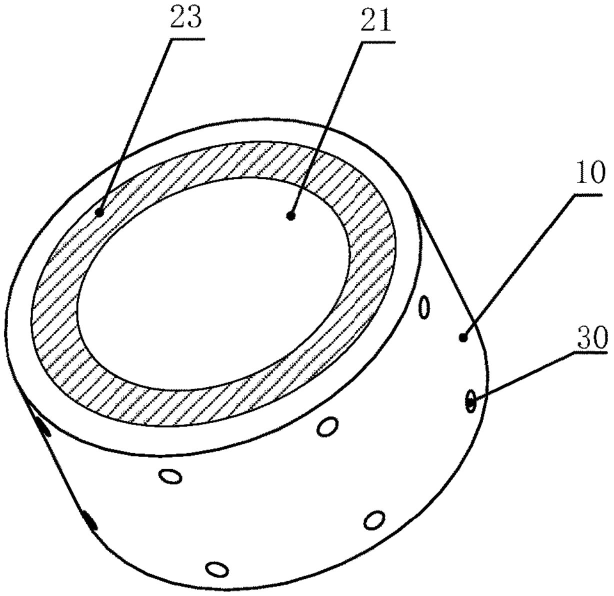
FIGS. 10A and 10B are schematic structures of an exemplary bone conduction speaker according to some embodiments of the present disclosure.
Figure 10B:
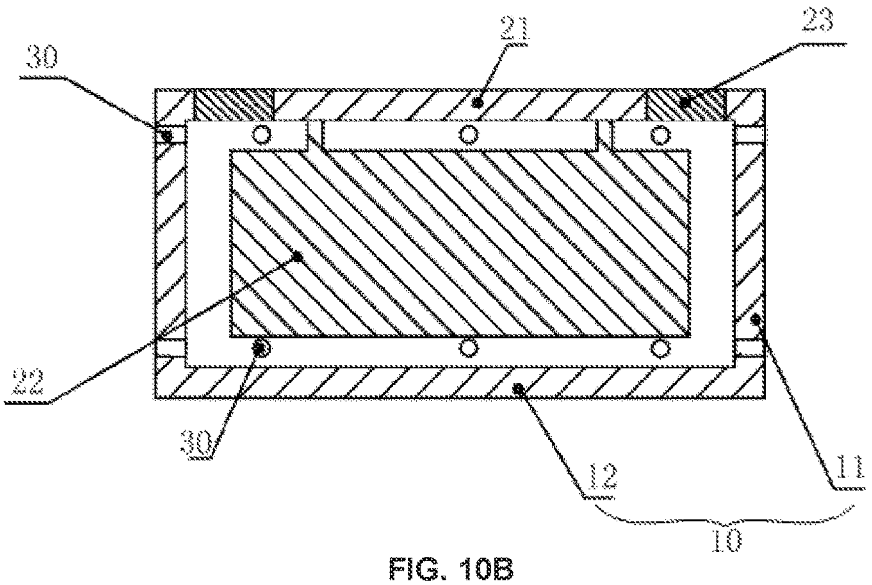

FIGS. 10A and 10B are schematic structures of an exemplary bone conduction speaker according to some embodiments of the present disclosure. The bone conduction speaker may include an open housing 10, a vibration board 21 and a transducer 22. One or more perforative sound guiding holes 30 may be arranged on both upper and lower portions of the sidewall of the housing 10. The sound guiding holes 30 may be arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be circle.

The shape of the sound guiding holes on the upper portion and the shape of the sound guiding holes on the lower portion may be different; One or more damping layers may be arranged in the sound guiding holes to reduce leaked sound waves of the same wave length (or frequency), or to reduce leaked sound waves of different wave lengths.

Figure 10C:
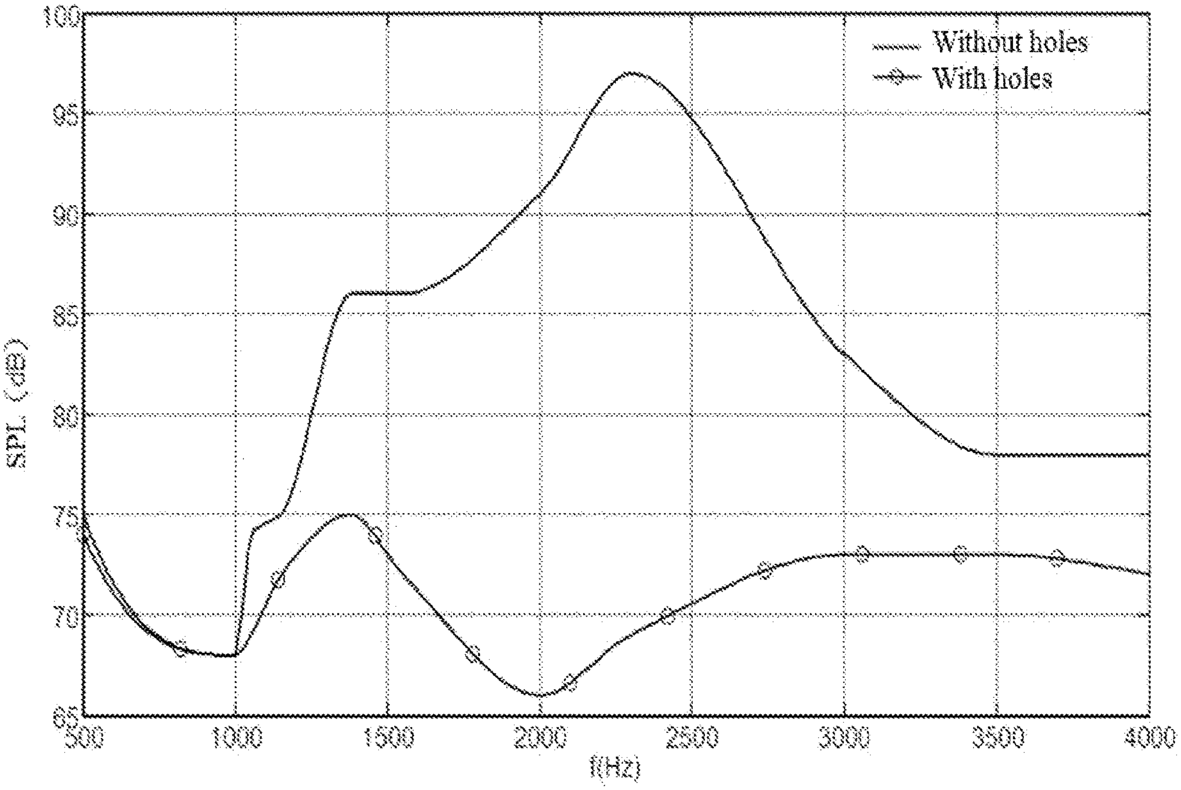
FIG. 10C is a diagram illustrating reduced sound leakage of a bone conduction speaker according to some embodiments of the present disclosure.

FIG. 10C is a diagram illustrating the effect of reducing sound leakage according to some embodiments of the present disclosure. In the frequency range of 1000 Hz~4000 Hz, the effectiveness of reducing sound leakage is outstanding. For example, in the frequency range of 1600 Hz~2700 Hz, the sound leakage is reduced by more than 15 dB; in the frequency range of 2000 Hz~2500 Hz, where the effectiveness of reducing sound leakage is most outstanding, the sound leakage is reduced by more than 20 dB. Compared to embodiment three, this scheme has a relatively balanced effect of reduced sound leakage on various frequency range, and this effect is better than the effect of schemes where the height of the holes are fixed, such as schemes of embodiment three, embodiment four, embodiment five, and so on.

In some embodiments, the sound guiding hole(s) at the upper portion of the sidewall of the housing 10 (also referred to as first hole(s)) may be approximately regarded as a point sound source. In some embodiments, the first hole(s) and the portion of the housing 10 that generates the leaked sound wave may constitute two-point sound sources (also referred to as first two-point sound sources). As for the first two-point sound sources, the guided sound wave generated by the first hole(s) (also referred to as first guided sound wave) may interfere with the leaked sound wave or a portion thereof generated by the portion of the housing 10 in a first region. In some embodiments, the sound waves output from the first two-point sound sources may have a same frequency (e.g., a first frequency). In some embodiments, the sound waves output from the first two-point sound sources may have a certain phase difference. In this case, the interference between the sound waves generated by the first two-point sound sources may reduce a sound pressure level of the leaked sound wave in the target region. When the position and phase difference of the first two-point sound sources meet certain conditions, the acoustic output device may output different sound effects in the near field (for example, the position of the user's ear) and the far field. For example, if the phases of the first two-point sound sources are opposite, that is, an absolute value of the phase difference between the first two-point sound sources is 180 degrees, the far-field leakage may be reduced according to the principle of reversed phase cancellation.

In some embodiments, the sound guiding hole(s) at the lower portion of the sidewall of the housing 10 (also referred to as second hole(s)) may also be approximately regarded as another point sound source. Similarly, the second hole(s) and the portion of the housing 10 that generates the leaked sound wave may also constitute two-point sound sources (also referred to as second two-point sound sources). As for the second two-point sound sources, the guided sound wave generated by the second hole(s) (also referred to as second guided sound wave) may interfere with the leaked sound wave or a portion thereof generated by the portion of the housing 10 in a second region. The second region may be the same as or different from the first region. In some embodiments, the sound waves output from the second two-point sound sources may have a same frequency (e.g., a second frequency).

In some embodiments, the first frequency and the second frequency may be in certain frequency ranges. In some embodiments, the frequency of the guided sound wave output from the sound guiding hole(s) may be adjustable. In some embodiments, the frequency of the first guided sound wave and/or the second guided sound wave may be adjusted by one or more acoustic routes. The acoustic routes may be coupled to the first hole(s) and/or the second hole(s). The first guided sound wave and/or the second guided sound wave may be propagated along the acoustic route having a specific frequency selection characteristic. That is, the first guided sound wave and the second guided sound wave may be transmitted to their corresponding sound guiding holes via different acoustic routes. For example, the first guided sound wave and/or the second guided sound wave may be propagated along an acoustic route with a low-pass characteristic to a corresponding sound guiding hole to output guided sound wave of a low frequency. In this process, the high frequency component of the sound wave may be absorbed or attenuated by the acoustic route with the low-pass characteristic. Similarly, the first guided sound wave and/or the second guided sound wave may be propagated along an acoustic route with a high-pass characteristic to the corresponding sound guiding hole to output guided sound wave of a high frequency. In this process, the low frequency component of the sound wave may be absorbed or attenuated by the acoustic route with the high-pass characteristic.

Figure 10D:
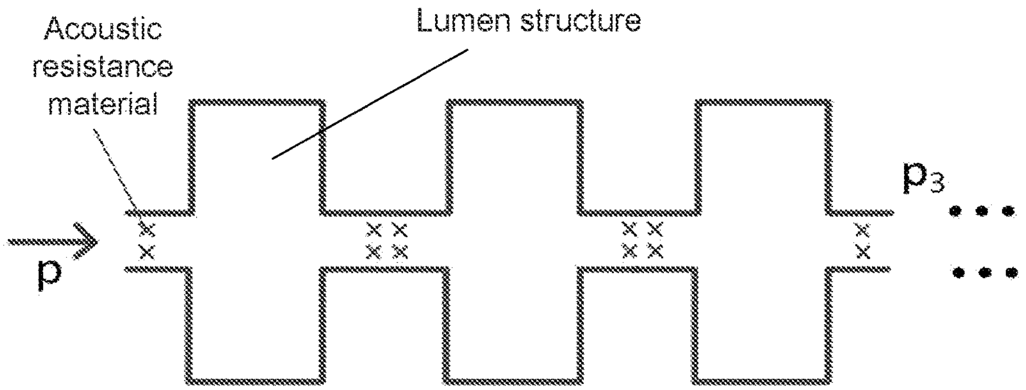
FIG. 10D is a schematic diagram illustrating an acoustic route according to some embodiments of the present disclosure.
Figure 10E:
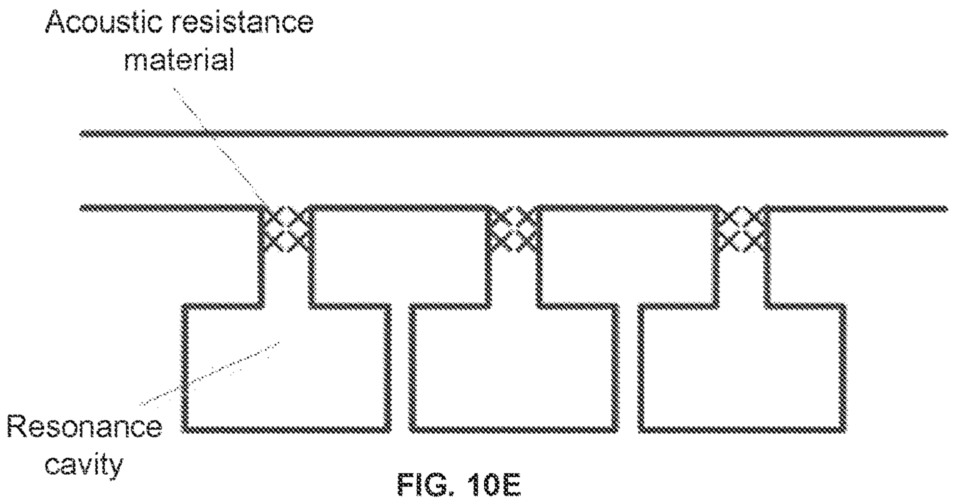
FIG. 10E is a schematic diagram illustrating another acoustic route according to some embodiments of the present disclosure.
Figure 10F:
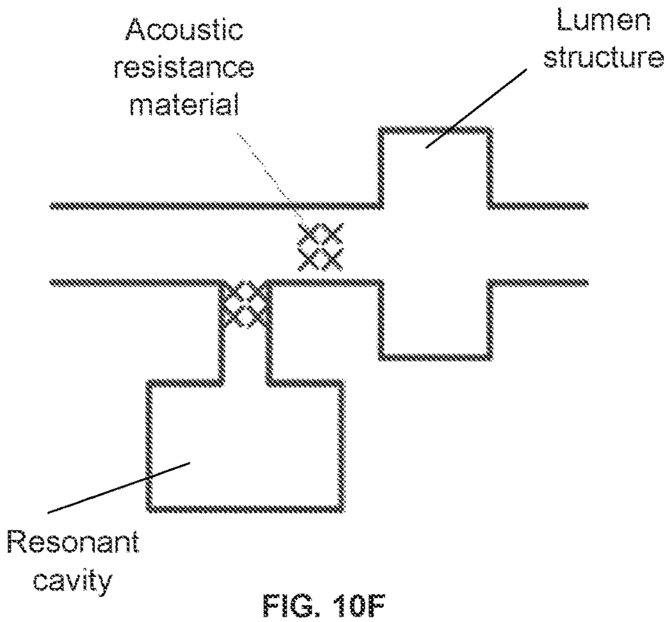
FIG. 10F is a schematic diagram illustrating a further acoustic route according to some embodiments of the present disclosure.

FIG. 10D is a schematic diagram illustrating an acoustic route according to some embodiments of the present disclosure. FIG. 10E is a schematic diagram illustrating another acoustic route according to some embodiments of the present disclosure. FIG. 10F is a schematic diagram illustrating a further acoustic route according to some embodiments of the present disclosure. In some embodiments, structures such as a sound tube, a sound cavity, a sound resistance, etc., may be set in the acoustic route for adjusting frequencies for the sound waves (e.g., by filtering certain frequencies). It should be noted that FIGS. 10D-10F may be provided as examples of the acoustic routes, and not intended be limiting.

As shown in FIG. 10D, the acoustic route may include one or more lumen structures. The one or more lumen structures may be connected in series. An acoustic resistance material may be provided in each of at least one of the one or more lumen structures to adjust acoustic impedance of the entire structure to achieve a desirable sound filtering effect. For example, the acoustic impedance may be in a range of 5MKS Rayleigh to 500MKS Rayleigh. In some embodiments, a high-pass sound filtering, a low-pass sound filtering, and/or a band-pass filtering effect of the acoustic route may be achieved by adjusting a size of each of at least one of the one or more lumen structures and/or a type of acoustic resistance material in each of at least one of the one or more lumen structures. The acoustic resistance materials may include, but not limited to, plastic, textile, metal, permeable material, woven material, screen material or mesh material, porous material, particulate material, polymer material, or the like, or any combination thereof. By setting the acoustic routes of different acoustic impedances, the acoustic output from the sound guiding holes may be acoustically filtered. In this case, the guided sound waves may have different frequency components.

As shown in FIG. 10E, the acoustic route may include one or more resonance cavities. The one or more resonance cavities may be, for example, Helmholtz cavity. In some embodiments, a high-pass sound filtering, a low-pass sound filtering, and/or a band-pass filtering effect of the acoustic route may be achieved by adjusting a size of each of at least one of the one or more resonance cavities and/or a type of acoustic resistance material in each of at least one of the one or more resonance cavities.

As shown in FIG. 10F, the acoustic route may include a combination of one or more lumen structures and one or more resonance cavities. In some embodiments, a high-pass sound filtering, a low-pass sound filtering, and/or a band-pass filtering effect of the acoustic route may be achieved by adjusting a size of each of at least one of the one or more lumen structures and one or more resonance cavities and/or a type of acoustic resistance material in each of at least one of the one or more lumen structures and one or more resonance cavities. It should be noted that the structures exemplified above may be for illustration purposes, various acoustic structures may also be provided, such as a tuning net, tuning cotton, etc.

In some embodiments, the interference between the leaked sound wave and the guided sound wave may relate to frequencies of the guided sound wave and the leaked sound wave and/or a distance between the sound guiding hole(s) and the portion of the housing 10. In some embodiments, the portion of the housing that generates the leaked sound wave may be the bottom of the housing 10. The first hole(s) may have a larger distance to the portion of the housing 10 than the second hole(s). In some embodiments, the frequency of the first guided sound wave output from the first hole(s) (e.g., the first frequency) and the frequency of second guided sound wave output from second hole(s) (e.g., the second frequency) may be different.

In some embodiments, the first frequency and second frequency may associate with the distance between the at least one sound guiding hole and the portion of the housing 10 that generates the leaked sound wave. In some embodiments, the first frequency may be set in a low frequency range. The second frequency may be set in a high frequency range. The low frequency range and the high frequency range may or may not overlap.

In some embodiments, the frequency of the leaked sound wave generated by the portion of the housing 10 may be in a wide frequency range. The wide frequency range may include, for example, the low frequency range and the high frequency range or a portion of the low frequency range and the high frequency range. For example, the leaked sound wave may include a first frequency in the low frequency range and a second frequency in the high frequency range. In some embodiments, the leaked sound wave of the first frequency and the leaked sound wave of the second frequency may be generated by different portions of the housing 10. For example, the leaked sound wave of the first frequency may be generated by the sidewall of the housing 10, the leaked sound wave of the second frequency may be generated by the bottom of the housing 10. As another example, the leaked sound wave of the first frequency may be generated by the bottom of the housing 10, the leaked sound wave of the second frequency may be generated by the sidewall of the housing 10. In some embodiments, the frequency of the leaked sound wave generated by the portion of the housing 10 may relate to parameters including the mass, the damping, the stiffness, etc., of the different portion of the housing 10, the frequency of the transducer 22, etc.

In some embodiments, the characteristics (amplitude, frequency, and phase) of the first two-point sound sources and the second two-point sound sources may be adjusted via various parameters of the acoustic output device (e.g., electrical parameters of the transducer 22, the mass, stiffness, size, structure, material, etc., of the portion of the housing 10, the position, shape, structure, and/or number (or count) of the sound guiding hole(s) so as to form a sound field with a particular spatial distribution. In some embodiments, a frequency of the first guided sound wave is smaller than a frequency of the second guided sound wave.

A combination of the first two-point sound sources and the second two-point sound sources may improve sound effects both in the near field and the far field.

Referring to FIGS. 4D, 7C, and 10C, by designing different two-point sound sources with different distances, the sound leakage in both the low frequency range and the high frequency range may be properly suppressed. In some embodiments, the closer distance between the second two-point sound sources may be more suitable for suppressing the sound leakage in the far field, and the relative longer distance between the first two-point sound sources may be more suitable for reducing the sound leakage in the near field. In some embodiments, the amplitudes of the sound waves generated by the first two-point sound sources may be set to be different in the low frequency range. For example, the amplitude of the guided sound wave may be smaller than the amplitude of the leaked sound wave. In this case, the sound pressure level of the near-field sound may be improved. The volume of the sound heard by the user may be increased.

Embodiment Seven

Figure 11A:
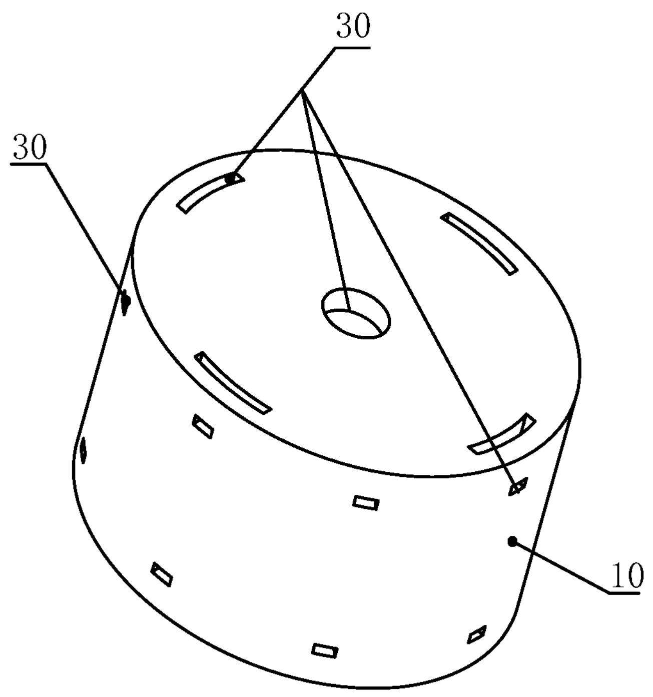
FIGS. 11A and 11B are schematic structures of an exemplary bone conduction speaker according to some embodiments of the present disclosure.
Figure 11B:
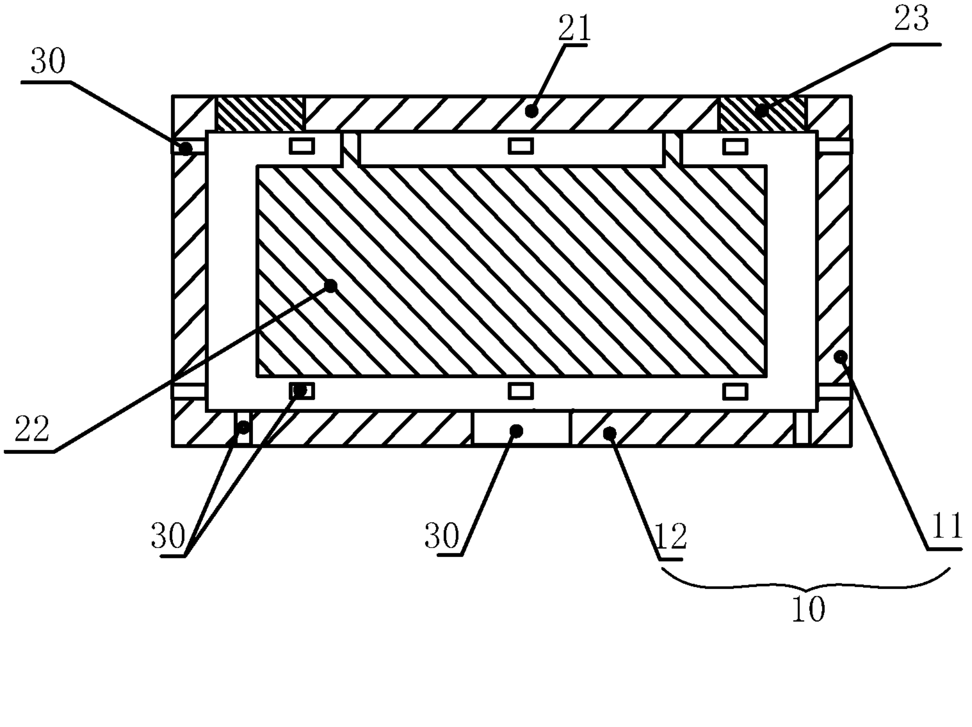

FIGS. 11A and 11B are schematic structures illustrating a bone conduction speaker according to some embodiments of the present disclosure. The bone conduction speaker may include an open housing 10, a vibration board 21 and a transducer 22. One or more perforative sound guiding holes 30 may be set on upper and lower portions of the sidewall of the housing 10 and on the bottom of the housing 10. The sound guiding holes 30 on the sidewall are arranged evenly or unevenly in one or more circles on the upper and lower portions of the sidewall of the housing 10. In some embodiments, the quantity of sound guiding holes 30 in every circle may be 8, and the upper portion sound guiding holes and the lower portion sound guiding holes may be symmetrical about the central cross section of the housing 10. In some embodiments, the shape of the sound guiding hole 30 may be rectangular. There may be four sound guiding holds 30 on the bottom of the housing 10. The four sound guiding holes 30 may be linear-shaped along arcs, and may be arranged evenly or unevenly in one or more circles with respect to the center of the bottom. Furthermore, the sound guiding holes 30 may include a circular perforative hole on the center of the bottom.

Figure 11C:
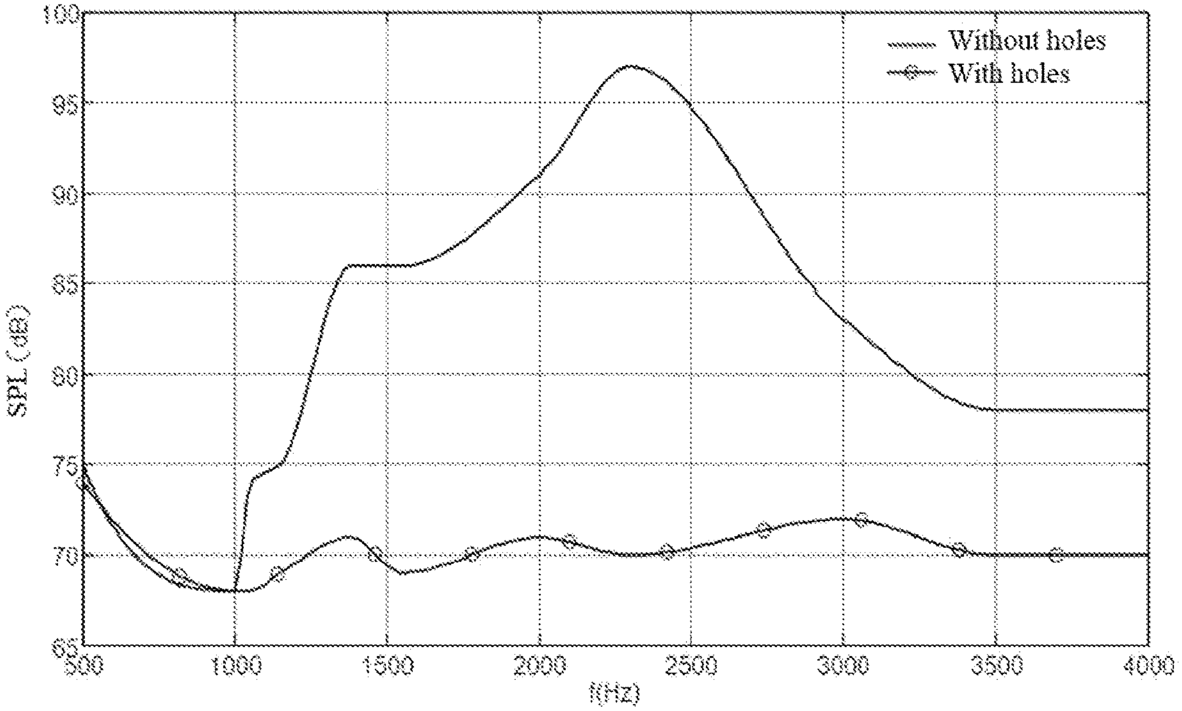
FIG. 11C is a diagram illustrating reduced sound leakage of a bone conduction speaker according to some embodiments of the present disclosure.

FIG. 11C is a diagram illustrating the effect of reducing sound leakage of the embodiment. In the frequency range of 1000 Hz~4000 Hz, the effectiveness of reducing sound leakage is outstanding. For example, in the frequency range of 1300 Hz~3000 Hz, the sound leakage is reduced by more than 10 dB; in the frequency range of 2000 Hz~2700 Hz, the sound leakage is reduced by more than 20 dB. Compared to embodiment three, this scheme has a relatively balanced effect of reduced sound leakage within various frequency range, and this effect is better than the effect of schemes where the height of the holes are fixed, such as schemes of embodiment three, embodiment four, embodiment five, and etc. Compared to embodiment six, in the frequency range of 1000 Hz~1400 Hz and 2500 Hz~4000 Hz, this scheme has a better effect of reduced sound leakage than embodiment six.

Embodiment Eight

Figure 12A:
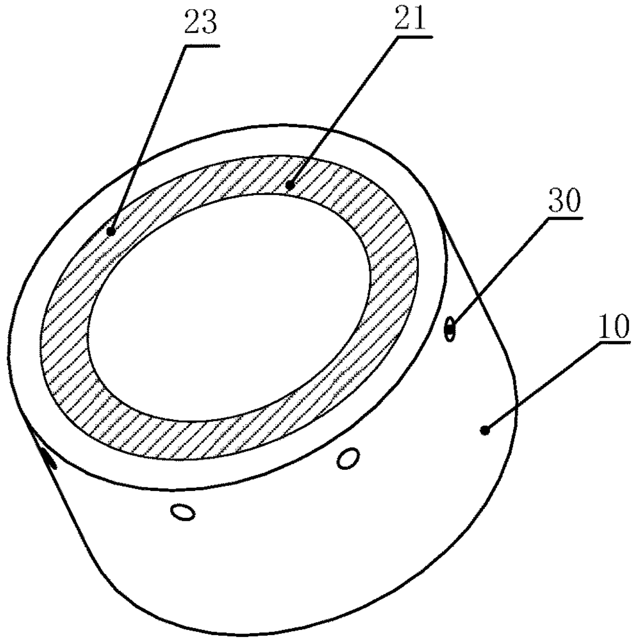
FIGS. 12A and 12B are schematic structures of an exemplary bone conduction speaker according to some embodiments of the present disclosure.
Figure 12B:
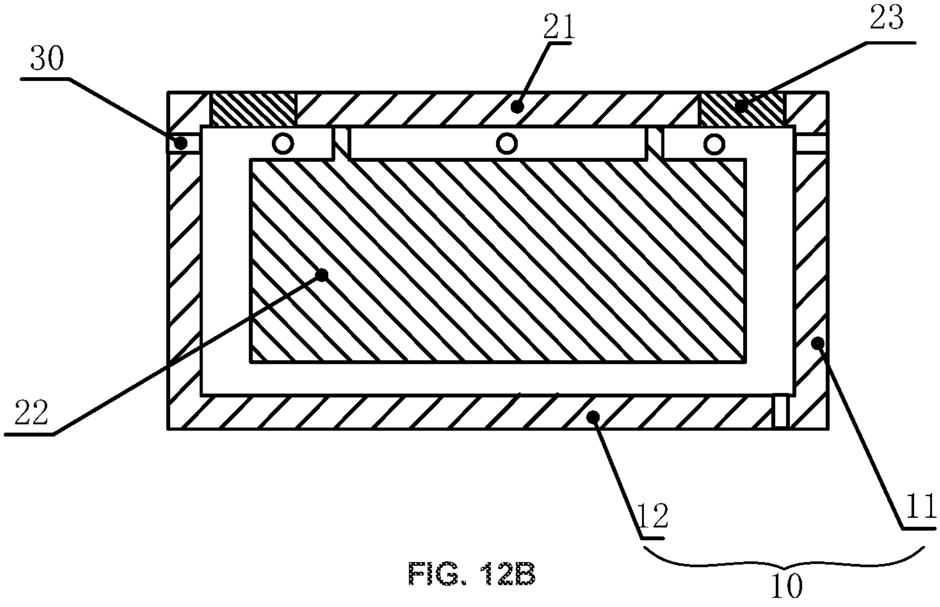

FIGS. 12A and 12B are schematic structures illustrating a bone conduction speaker according to some embodiments of the present disclosure. The bone conduction speaker may include an open housing 10, a vibration board 21 and a transducer 22. A perforative sound guiding hole 30 may be set on the upper portion of the sidewall of the housing 10. One or more sound guiding holes may be arranged evenly or unevenly in one or more circles on the upper portion of the sidewall of the housing 10. There may be 8 sound guiding holes 30, and the shape of the sound guiding holes 30 may be circle.

After comparison of calculation results and test results, the effectiveness of this embodiment is basically the same with that of embodiment one, and this embodiment can effectively reduce sound leakage.

Embodiment Nine

Figure 13A:
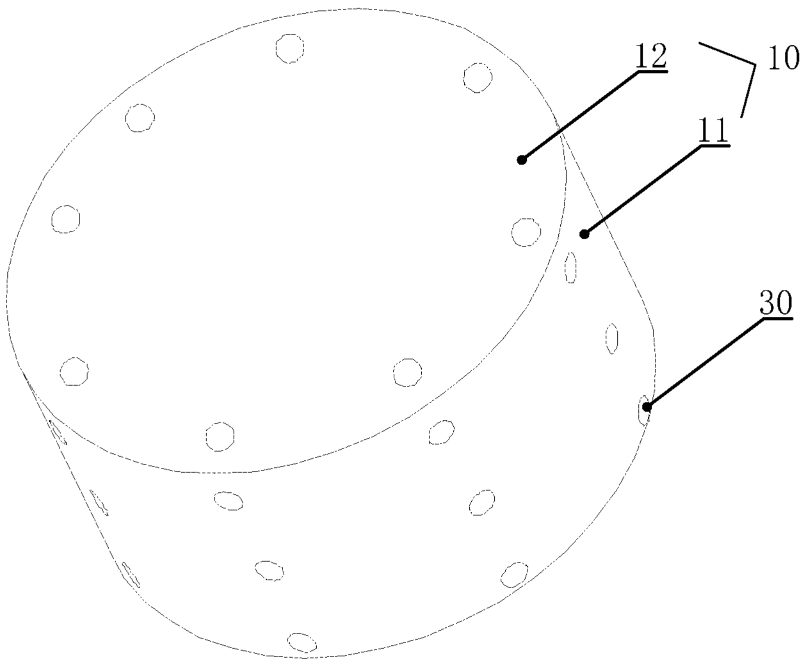
FIGS. 13A and 13B are schematic structures of an exemplary bone conduction speaker according to some embodiments of the present disclosure.
Figure 13B:
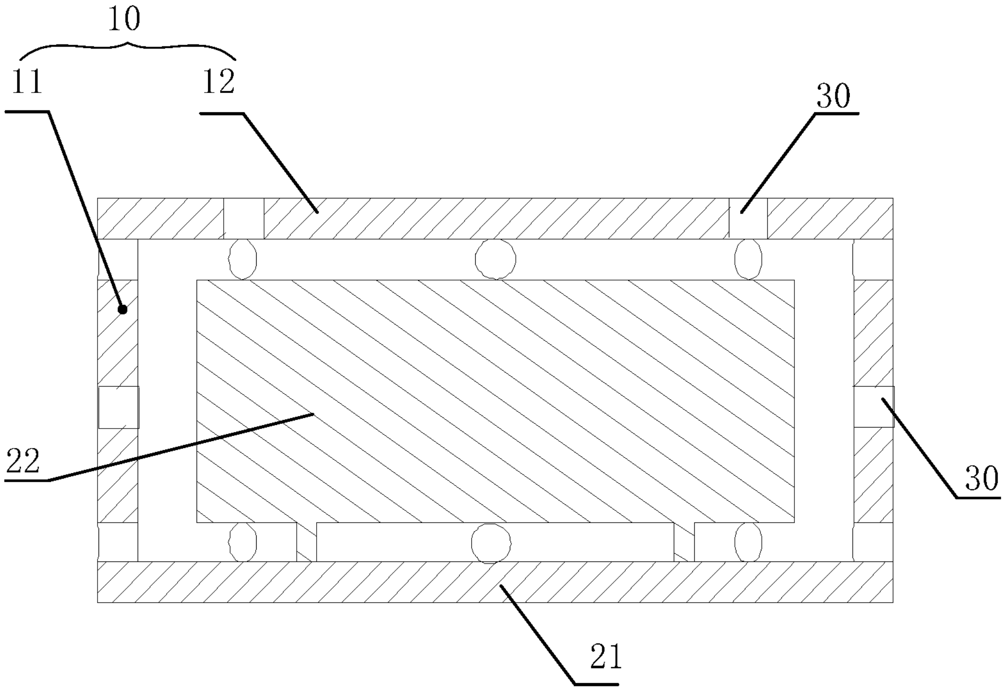

FIGS. 13A and 13B are schematic structures illustrating a bone conduction speaker according to some embodiments of the present disclosure. The bone conduction speaker may include an open housing 10, a vibration board 21 and a transducer 22.

The difference between this embodiment and the above-described embodiment three is that to reduce sound leakage to greater extent, the sound guiding holes 30 may be arranged on the upper, central and lower portions of the sidewall 11. The sound guiding holes 30 are arranged evenly or unevenly in one or more circles. Different circles are formed by the sound guiding holes 30, one of which is set along the circumference of the bottom 12 of the housing 10. The size of the sound guiding holes 30 are the same.

The effect of this scheme may cause a relatively balanced effect of reducing sound leakage in various frequency ranges compared to the schemes where the position of the holes are fixed. The effect of this design on reducing sound leakage is relatively better than that of other designs where the heights of the holes are fixed, such as embodiment three, embodiment four, embodiment five, etc.

Embodiment Ten

The sound guiding holes 30 in the above embodiments may be perforative holes without shields.

In order to adjust the effect of the sound waves guided from the sound guiding holes, a damping layer (not shown in the figures) may locate at the opening of a sound guiding hole 30 to adjust the phase and/or the amplitude of the sound wave.

There are multiple variations of materials and positions of the damping layer. For example, the damping layer may be made of materials which can damp sound waves, such as tuning paper, tuning cotton, nonwoven fabric, silk, cotton, sponge or rubber. The damping layer may be attached on the inner wall of the sound guiding hole 30, or may shield the sound guiding hole 30 from outside.

More preferably, the damping layers corresponding to different sound guiding holes 30 may be arranged to adjust the sound waves from different sound guiding holes to generate a same phase. The adjusted sound waves may be used to reduce leaked sound wave having the same wavelength. Alternatively, different sound guiding holes 30 may be arranged to generate different phases to reduce leaked sound wave having different wavelengths (i.e., leaked sound waves with specific wavelengths).

In some embodiments, different portions of a same sound guiding hole can be configured to generate a same phase to reduce leaked sound waves on the same wavelength (e.g., using a pre-set damping layer with the shape of stairs or steps). In some embodiments, different portions of a same sound guiding hole can be configured to generate different phases to reduce leaked sound waves on different wavelengths.

The above-described embodiments are preferable embodiments with various configurations of the sound guiding hole(s) on the housing of a bone conduction speaker, but a person having ordinary skills in the art can understand that the embodiments don't limit the configurations of the sound guiding hole(s) to those described in this application.

In the past bone conduction speakers, the housing of the bone conduction speakers is closed, so the sound source inside the housing is sealed inside the housing. In the embodiments of the present disclosure, there can be holes in proper positions of the housing, making the sound waves inside the housing and the leaked sound waves having substantially same amplitude and substantially opposite phases in the space, so that the sound waves can interfere with each other and the sound leakage of the bone conduction speaker is reduced. Meanwhile, the volume and weight of the speaker do not increase, the reliability of the product is not comprised, and the cost is barely increased. The designs disclosed herein are easy to implement, reliable, and effective in reducing sound leakage.

In some embodiments, the speaker described elsewhere in the present disclosure (e.g., the speaker shown in FIG. 4A through 13B) may further include a noise reduction assembly for noise reduction. For example, the noise reduction assembly may be configured to receive a target sound (e.g., a voice of a user wearing the speaker) and reduce noise of the target sound. As another example, the noise reduction assembly may be configured to reduce a noise headed by the user. More descriptions regarding the noise reduction assembly may be found in the following descriptions.

Figure 14:
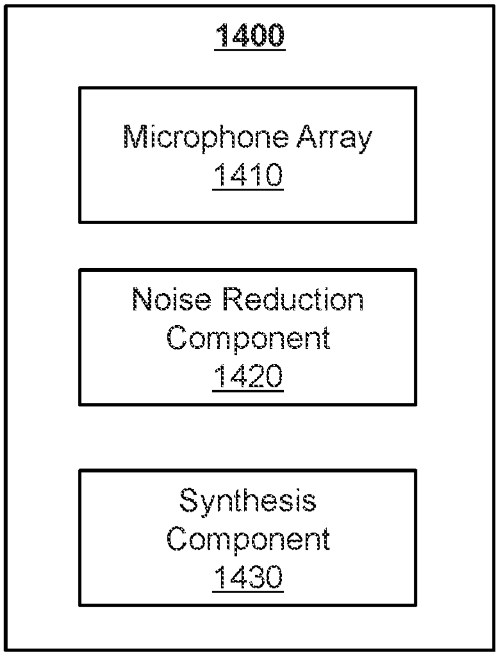
FIG. 14 is a schematic diagram illustrating a noise reduction assembly of a speaker according to some embodiments of the present disclosure.

FIG. 14 is a schematic diagram illustrating a noise reduction assembly of a speaker according to some embodiments of the present disclosure. The speaker may receive sound (also referred to as "target sound"). The noise reduction assembly 1400 may also be configured to reduce or eliminate noise included in the received sound. In some embodiments, the noise may include background noise, sound that is not intended to be collected when a user wears the audio device, for example, a traffic noise, a wind noise, etc. The noise reduction assembly 1400 may be applied to various fields and/or devices, such as a headphone, a smart device (e.g., VR glasses, eyeglasses), a muffler, an anti-snoring device, or the like, or any combination thereof.

As shown in FIG. 14, the noise reduction assembly 1400 may include a microphone array 1410, a noise reduction component 1420, and a synthesis component 1430. Tn some embodiments, two or more components of the noise reduction assembly 1400 may be connected and/or communicate with each other. For example, the noise reduction component 1420 may be electrically connected to each of the microphones in the microphone array 1410. As used herein, a connection between two components may include a wireless connection, a wired connection, any other communication connection that may enable data transmission and/or reception, or any combination thereof. For example, the wireless connection may include a Bluetooth™ connection, a Wi-Fi™ connection, a WiMax™ connection, a WLAN connection, a ZigBee connection, a mobile network connection (e.g., 3G, 4G, 5G, etc.), or the like, or a combination thereof. For example, the wired connection may include a coaxial cable, a communication cable, a flexible cable, a spiral cable, a non-metal sheathed cable, a metal sheathed cable, a multi-core cable, a twisted pair cable, a ribbon cable, a shielded cable, a double-stranded cable, an optical fiber, a cable, an optical cable, a telephone line, or the like, or any combination thereof.

The microphone array 1410 may be configured to collect sound signal(s) (also referred to as acoustic signal(s)) related to the target sound. The microphone array 1410 may include at least one low-frequency microphone and at least one high-frequency microphone. The at least one low-frequency microphone may be used to collect low-frequency sound signal(s) of the sound signal(s). The at least one high-frequency microphone may be used to collect high-frequency sound signal(s) of the sound signal(s). In some embodiments, the low-frequency microphone(s) and/or the high-frequency microphone(s) may be separately arranged in the speaker to form a distributed microphone array. For example, the low-frequency microphone(s) and/or the high-frequency microphone(s) may be disposed at various positions of the speaker. The microphones at each of the various positions may be wirelessly connected.

Figure 15A:
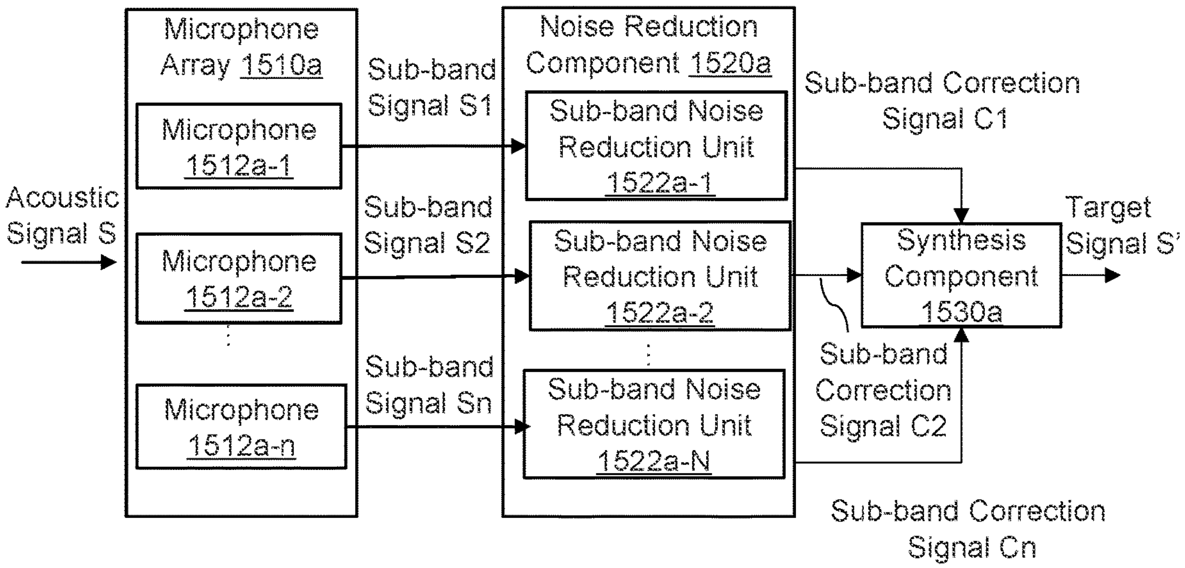
FIG. 15A is a schematic diagram illustrating an exemplary noise reduction assembly according to some embodiments of the present disclosure.
Figure 15B:
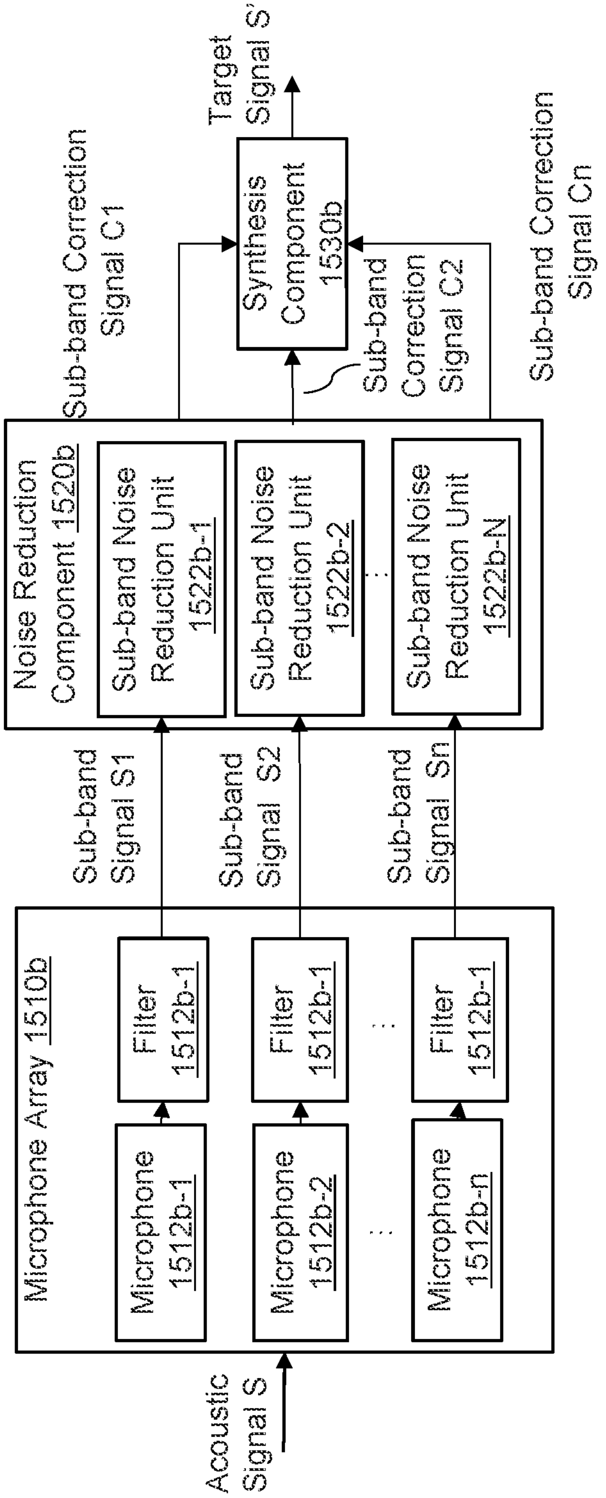
FIG. 15B is a schematic diagram illustrating an exemplary noise reduction assembly according to some embodiments of the present disclosure.

In some embodiments, each microphone in the microphone array 1410 may be used to detect an acoustic signal (e.g., including both the target sound and the noise) (e.g., an acoustic signal S illustrated in FIGS. 15A-15B) and process the detected acoustic signal into at least two sub-band sound signals (also referred to as sub-band sound signals, e.g., sub-band sound signals S1, S2, . . . , Sn illustrated in FIGS. 15A-15B) (denoted as $S_i(n)$). In some embodiments, each microphone in the microphone array 1410 may correspond to a filter. The acoustic signal may be processed into the at least two sub-band sound signals via the filter. As used herein, an acoustic signal may be an audio signal having a specific frequency band. The sub-band sound signals generated after processing the acoustic signal may have narrower frequency bands than the frequency band of the acoustic signal. However, the frequency bands of the sub-band sound signals may be within a range of the frequency band of the acoustic signal. For example, an acoustic signal may have a frequency band ranging from 10 Hz to 30 kHz. The frequency bands of the sub-band sound signals may range from 100 Hz to 200 Hz, which is narrower than the frequency range of the acoustic signal but within the frequency range of the acoustic signal. In some embodiments, a combination of the frequency bands of the sub-band sound signals may cover the frequency band of the acoustic signal. Additionally or alternatively, at least two of the sub-band sound signals may have different frequency bands. Optionally, each of the sub-band sound signals may have a feature frequency band different from frequency bands of other sub-band sound signals. Different sub-band sound signals may have a same frequency bandwidth or different frequency bandwidths. In the sub-band sound signals, two sub-band sound signals whose center frequencies are adjacent to each other may be considered to be adjacent to each other in a frequency domain. More descriptions of the frequency bands of a pair of adjacent sub-band sound signals may be found elsewhere in the present disclosure, for example, FIGS. 16A and 16B and the descriptions thereof.

In some embodiments, a signal generated by the microphone array 1410 may include a digital signal or an analog signal. In some embodiments, each of the microphones in the microphone array 1410 may include a micro electro mechanical system (MEMS) microphone. The MEMS microphone may have a low operating current. The performance of the MEMS microphone may be stable. A sound generated by the MEMS microphone may have a high quality. In some embodiments, at least a part of the microphones in the microphone array 1410 may include other types of microphones, and be not limited herein.

The noise reduction component 1420 may be configured to perform noise reduction on the sub-band sound signals collected by the microphone array 1410. In some embodiments, the noise reduction component 1420 may perform noise estimation, adaptive filtering, sound enhancement, etc., on the collected sub-band sound signals, thereby implementing the noise reduction on the sound. Specifically, the noise reduction component 1420 may estimate a sub-band noise signal according to a noise estimation algorithm, and then generate a sub-band noise correction signal according to the sub-band noise signal. A target sub-band sound signal (denoted as $C_i(n)$) may be generated based on the sub-band sound signal and the sub-band noise correction signal, thereby reducing the noise in the sub-band sound signal. The sub-band noise correction signal may include an analog signal or a digital signal having a phase opposite to that of the sub-band noise signal. In some embodiments, the noise estimation algorithm may include a time-recursive average noise estimation algorithm, a minimum tracking noise estimation algorithm, or the like, or a combination thereof. In some embodiments, the microphone array 1410 may include at least a pair of low-frequency microphones and at least a pair of high-frequency microphones. Each pair of the microphones may correspond to a sub-band sound signal with a same frequency band. The noise reduction component 1420 may use a sound signal collected by a microphone closer to a main sound source (e.g., a human mouth) in each pair of the microphones as the sub-band sound signal. A sound signal collected by another microphone in the pair of microphones far from the main sound source may be used as the sub-band noise signal. The noise reduction component 1420 may perform the noise reduction on the sub-band sound signal by using a differential sub-band sound signal and the sub-band noise signal. More descriptions of the noise reduction component 1420 and the sub-band noise signal may be found elsewhere in the present disclosure, for example, FIG. 15A, FIG. 17, and FIG. 18 and the descriptions thereof.

The synthesis component 1430 may be configured to combine the target sub-band sound signals to generate a target signal. The synthesis component 1430 may include any component capable of combining at least two signals.

FIG. 15A is a schematic diagram illustrating an exemplary noise reduction assembly according to some embodiments of the present disclosure. The noise reduction assembly 1500A may be an example of the noise reduction assembly illustrated in FIG. 14. As shown in FIG. 15A, the noise reduction assembly 1500A may include a microphone array 1510*a*, a noise reduction component 1520*a*, and a synthesis component 1530*a*. The microphone array 1510*a* may include at least two microphones 1512*a*. The number (or count) of the microphones 1512*a* may equal the number (or count) of sub-band sound signals. The number (or count) of the sub-band sound signals (e.g., n) may be related to the frequency band of an acoustic signal S and each frequency band of the sub-band sound signal. For example, a certain count of microphones 1512*a* may be used so that a combination of frequency bands of the sub-band sound signals may cover the frequency band of the acoustic signal. Optionally, an overlap between frequency bands of any pair of adjacent sub-band sound signals in the sub-band sound signals may be avoided.

The microphone 1512*a* may have different frequency responses to the acoustic signal S, and be used to generate a sub-band sound signal by processing the acoustic signal S. For example, the microphone 1512*a*-1 may respond to a sound signal at frequencies between 20 Hz and 3 kHz. After the acoustic signal S (for example, 2 Hz to 30 kHz) is processed by the microphone 1512*a*-1, a sub-band sound signal corresponding to the frequency band ranging from 20 Hz to 3 kHz may be obtained. In some embodiments, the sub-band sound signal generated by the microphone array 1510*a* may include a digital signal or an analog signal.

In some embodiments, the microphone 1512*a* may include an acoustic channel element and a sound sensitive element. The acoustic channel element may form a route through which the acoustic signal S is transmitted to the sound sensitive element. For example, the acoustic channel element may include one or more cavity structures, one or more duct structures, or the like, or any combination thereof. The sound sensitive element may convert the acoustic signal S transmitted through the acoustic channel element into an electrical signal. For example, the sound sensitive element may include a diaphragm, a plate, a cantilever, etc. The diaphragm may be used to convert a sound pressure change generated by a sound on a surface of the diaphragm into a mechanical vibration of the diaphragm. The sound sensitive element may be made of one or more materials including, for example, a plastic, a metal, a piezoelectric material, etc., or any composite material.

In some embodiments, the frequency response of the microphone 1512*a* may relate to an acoustic structure of the acoustic channel element of the microphone 1512*a*. For example, the acoustic channel element of the microphone 1512*a* may have a specific acoustic structure that may process the sound before the sound reaches the sound sensitive element of the microphone 1512*a*. In some embodiments, the acoustic structure of the acoustic channel element may have a specific acoustic impedance so that the acoustic channel element may be used as a filter to filter the sound to generate a sub-band acoustic signal. The sound sensitive element of the microphone 1512*a* may convert the sub-band acoustic signal into an electrical signal of the sub-band sound signal.

In some embodiments, the acoustic impedance of the acoustic structure may relate to the frequency band of the sound. In some embodiments, an acoustic structure mainly including the cavity structure(s) may be used as a high-pass filter. An acoustic structure mainly including the duct structure(s) may be used as a low-pass filter. For example, the acoustic channel element may have a tube structure. The tube structure may be regarded as a combination of a sound capacity and a sound quality in series and form an inductor-capacitor (LC) resonant circuit. If an acoustic resistance material is used in the tube structure, a resistor-inductor-capacitor (RLC) series circuit may form and the acoustic impedance of the RLC series circuit may be determined according to Equation (14) described below:

$$Z = R_a + j\left(\omega M_a - \frac{1}{\omega C_a}\right), \quad (14)$$

where Z refers to the acoustic impedance of the acoustic channel element, ω refers to an angular frequency of the tube structure, j refers to the imaginary unit, $M_a$ refers to the sound quality, $C_a$ refers to the sound capacity, and $R_a$ refers to an acoustic resistance of the RLC series circuit. The tube structure may be used as a band-pass filter (denoted as F1). A bandwidth of the band-pass filter F1 may be adjusted by adjusting the acoustic resistance $R_a$. The center frequency $\omega_0$ of the band-pass filter F1 may be adjusted by adjusting the sound quality $M_a$ and/or the sound capacity $C_a$. For example, the center frequency $\omega_0$ of the band-pass filter F1 may be determined according to Equation (15) described below:

$$\omega_0 = \sqrt{M_a C_a}. \quad (15)$$

In some embodiments, the frequency response of the microphone 1512*a* may relate to the physical characteristics (e.g., a material, a structure) of the sound sensitive element of the microphone 1512*a*. A sound sensitive element with specific physical characteristics may be sensitive to a certain frequency band of an audio.

For example, the sound sensitive element may include a diaphragm used as a band-pass filter (denoted as F2). A center frequency $\omega'_0$ of the band-pass filter F2 may be determined according to equation (16) described below:

$$\omega'_0 = \sqrt{\frac{K_m}{M_m}}, \quad (16)$$

where $M_m$ refers to the mass of the diaphragm, and $K_m$ refers to an elastic coefficient of the diaphragm. In some embodiments, the bandwidth of the band-pass filter F2 may be adjusted by adjusting a damping of the diaphragm ($R_m$). The center frequency of the band-pass filter F2 may be adjusted by adjusting the mass of the diaphragm and/or the coefficient of elasticity of the diaphragm $\omega'_0$.

As described above, the acoustic channel element or the sound sensitive element of the microphone 1512*a* may be used as the filter. The frequency response of the microphone 1512*a* may be adjusted by modifying the parameter (e.g., $R_a$, $M_a$, $C_a$) of the acoustic channel element or the parameter (e.g., $K_m$, $R_m$) of the sound sensitive element. More descriptions of acoustic channel element and/or the sound sensitive elements used as the band-pass filter may be found in, for example, international application No. PCT/CN2018/105161, named "SIGNAL PROCESSING DEVICE HAVING MULTIPLE ACOUSTIC-ELECTRIC TRANSDUCERS", the contents of which are hereby incorporated by reference.

The noise reduction component 1520*a* may include at least two sub-band noise reduction units 1522*a*. Each of the sub-band noise reduction units 1522*a* may correspond to one microphone 1512*a*. The sub-band noise reduction unit 1522*a* may be configured to generate a sub-band noise correction signal based on the noise in the sub-band sound signal for reducing the noise in the sub-band sound signal, thereby generating the target sub-band sound signal. For example, a sub-band noise reduction unit 1522*a-i* (i is a positive integer equal to or less than n) may receive a sub-band sound signal Si from the microphone 1512*a-i* and generate a sub-band noise correction signal Ci for reducing noise in the sub-band sound signal Si. In some embodiments, the sub-band noise reduction unit 1522*a* may include a sub-band noise estimation sub-unit (not shown) and a sub-band noise suppression sub-unit (not shown). The sub-band noise estimation sub-unit may be configured to estimate the noise in a sub-band sound signal. The sub-band noise suppression sub-unit may be configured to receive the noise in the sub-band sound signal from the sub-band noise estimation sub-unit, and generate the sub-band noise correction signal to reduce the sub-band noise signal in the sub-band sound signal.

In some embodiments, the sub-band noise reduction unit 1522*a-i* may first estimate a sub-band noise signal $N_i$, and then perform phase modulation and/or amplitude modulation on the sub-band noise signal $N_i$ to generate a corresponding sub-band noise correction signal $N'_i$. In some embodiments, the phase modulation and the amplitude modulation may be performed subsequently or simultaneously on the sub-band noise signal $N_i$. For example, the sub-band noise reduction unit 1522*a-i* may first perform the phase modulation on the sub-band noise signal $N_i$ to generate a phase modulation signal, and then perform the amplitude modulation on the phase modulation signal to generate the corresponding sub-band noise correction signal $N'_i$. The phase modulation of the sub-band noise signal $N_i$ may include inverting the phase of the sub-band noise signal $N_i$. In some embodiments, the phase of the noise may shift during transmission from a position of the microphone 1512*a-i* to a position of the sub-band noise reduction unit 1522*a-i*. The phase modulation of the sub-band noise signal $N_i$ may also include compensating the phase shift of the sub-band noise signal $N_i$ during the signal transmission. Alternatively, the sub-band noise reduction unit 1522*a-i* may first perform the amplitude modulation on the sub-band noise signal $N_i$ to generate an amplitude modulation signal, and then perform the phase modulation on the amplitude modulation signal to generate the sub-band noise correction signal $N'_i$. More descriptions of the sub-band noise reduction unit 1522*a-i* may be found elsewhere in the present disclosure, for example, FIGS. 17 and 18 and the descriptions thereof.

In some embodiments, the noise reduction component 1520*a* may use two sets of microphones with same configurations (for example, two microphone arrays 1510*a*) to perform the noise reduction according to a dual microphone noise reduction principle. Each set of the microphones may include microphones corresponding to a plurality of sub-band sound signals of different frequency bands. For brevity, one set of the microphones may be denoted as a first microphone group, and another set of the microphones may be denoted as a second microphone group. As used herein, a distance between the first microphone group and the main sound source (e.g., the human mouth) may be shorter than a distance between the second microphone group and the main sound source. A first microphone in the first microphone group may correspond to a second microphone in the second microphone group. For example, a first microphone corresponding to a frequency band of 20 Hz-3 kHz in the first microphone group may correspond to a second microphone corresponding to a frequency band of 20 Hz-3 kHz in the second microphone group. A signal collected by the first microphone in the first microphone group may be used as the sub-band sound signal. A signal collected by the second microphone in the corresponding second microphone group may be used as the sub-band noise signal. The noise reduction component 1520*a* may generate the target sub-band sound signal according to the sub-band sound signal and the sub-band noise signal. More descriptions of using the two microphone arrays for the noise reduction may be found elsewhere in the present disclosure, for example, FIGS. 16A and 16B and the descriptions thereof.

The synthesis component 1530*a* may be configured to combine the target sub-band sound signals to generate a target signal S'.

It should be noted that the microphone array 1510*a* and/or the noise reduction component 1520*a* is merely provided for the purposes of illustration, and is not intended to limit the scope of the present disclosure. For persons having ordinary skills in the art, multiple variations or modifications may be made under the teachings of the present disclosure. However, those variations and modifications do not depart from the scope of the present disclosure. For example, the microphone array 1510*a* and/or the noise reduction component 1520*a* may include one or more additional components. Additionally or alternatively, one or more components of the microphone array 1510*a* and/or the noise reduction component 1520*a* may be omitted. As another example, two or more components of the microphone array 1510*a* and/or the noise reduction component 1520*a* may be integrated into a single component.

FIG. 15B is a schematic diagram illustrating an exemplary noise reduction assembly 1500B according to some embodiments of the present disclosure. The noise reduction assembly 1500B may be an example of the noise reduction assembly illustrated in FIG. 14. As shown in FIG. 15B, the noise reduction assembly 1500B may include a microphone array 1510*b*, a noise reduction component 1520*b*, and a synthesis component 1530*b*. The microphone array 1510*b* may include at least two microphones 1512*b* and at least two filters 1514*b*. The count of the microphones 1512*b*, the count of the filters 1514*b*, and the count of the sub-band sound signals may be equal. The microphones 1512*b* may have a same configuration. In other words, each of the microphones 1512*b* may have a same frequency response to the acoustic signal S. After receiving the acoustic signal S, the microphone 1512*b* may transmit the acoustic signal S to a corresponding filter 1514*b*, and generate a sub-band sound signal through the filter 1514*b*. The filters 1514*b* corresponding to each microphone 1512*b* may have different frequency selective characteristics. Exemplary filters 1514*b* may include a passive filter, an active filter, an analog filter, a digital filter or the like, or any combination thereof.

The noise reduction component 1520*b* may include at least two sub-band noise reduction units 1522*b*. Each of the sub-band noise reduction units 1522*b* may correspond to a filter 1514*b* (or a microphone 1512*b*). More descriptions of the noise reduction component 1520*b* and the synthesis component 1530*b* may be found elsewhere in the present disclosure, for example, FIG. 15A and the descriptions thereof and not repeat herein.

Figure 16A:
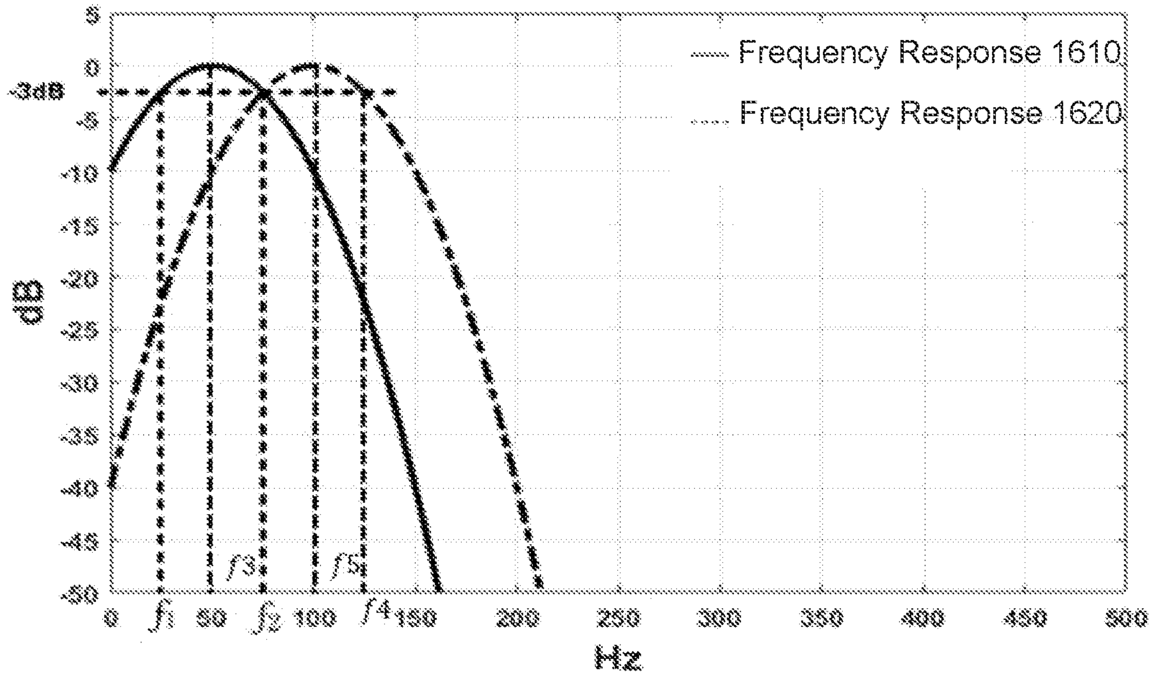
FIG. 16A illustrates an exemplary frequency response of a first microphone and an exemplary frequency response of a second microphone according to some embodiments of the present disclosure.
Figure 16B:
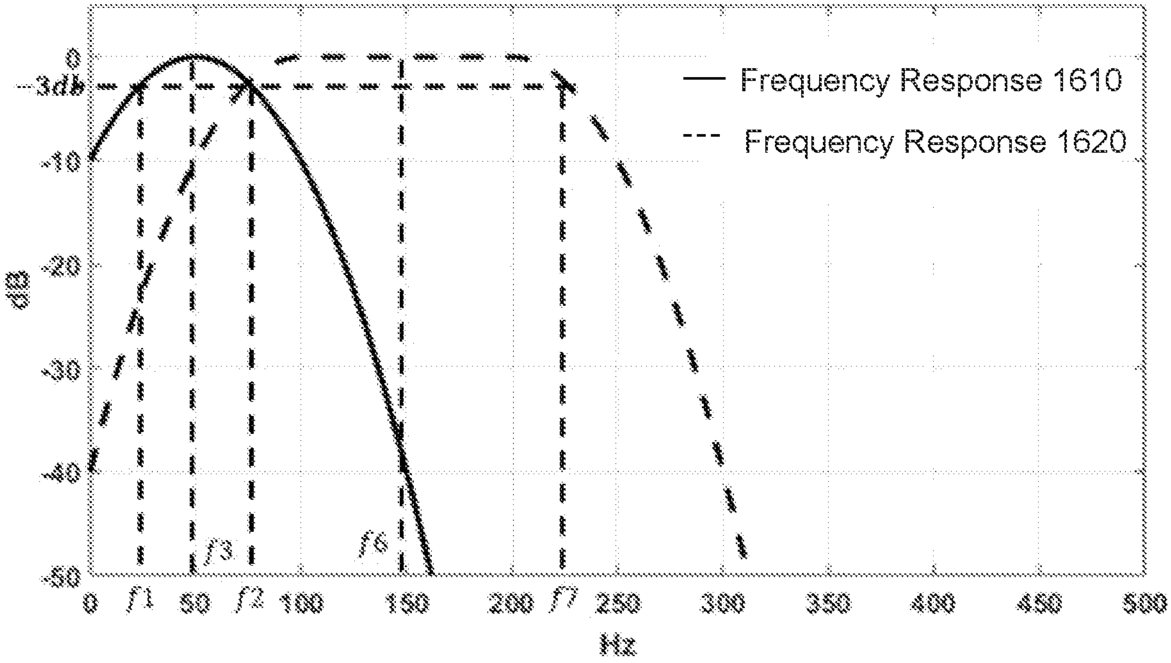
FIG. 16B illustrates an exemplary frequency response of a first microphone and an exemplary frequency response of a second microphone according to some embodiments of the present disclosure.

FIG. 16A illustrates an exemplary frequency response of a first microphone and an exemplary frequency response of a second microphone according to some embodiments of the present disclosure. FIG. 16B illustrates another exemplary frequency response of a first microphone and an exemplary frequency response of a second microphone according to the present disclosure. The first microphone may be configured to process an acoustic signal to generate a first sub-band sound signal. The second band microphone may be configured to process an acoustic signal to generate a second sub-band sound signal. In the sub-band sound signal, the second sub-band sound signal may be adjacent to the first sub-band sound signal in a frequency domain.

In some embodiments, the frequency responses of the first and second microphones may have a same frequency bandwidth. For example, as shown in FIG. 16A, the frequency response 1610 of the first microphone may have a lower half-power point f1, a higher half-power point f2, and a center frequency f3. As used herein, a half-power point of a certain frequency response may refer to a frequency point with a specific power suppression (e.g., −3 dB). A frequency bandwidth of the frequency response 1610 may equal a difference between f2 and f1. The frequency response of the second microphone 1620 may have a lower half-power point f2, a higher half-power point f4, and a center frequency f5. A frequency bandwidth of the frequency response 1620 may equal a difference between f4 and f2. The frequency bandwidths of the first and second microphones may be equal to each other.

In some embodiments, the frequency responses of the first and second microphones may have different frequency bandwidths. For example, as shown in FIG. 16B, the frequency response 1620 of the second microphone may have a lower half-power point f2, a higher half-power point f7 (greater than f4), and a center frequency f6. The frequency bandwidth of the frequency response 1620 of the second microphone may equal a difference between f7 and f2, and the difference may be greater than the frequency bandwidth of the frequency response 1610 of the first microphone. In this manner, fewer microphones may be required in the microphone array 1510*a* to cover the frequency band of the original acoustic signal.

In some embodiments, the frequency responses of the first microphone and the second microphone may intersect at a specific frequency point. The intersection point of the frequency response may cause a certain overlapping range between the first and second frequency responses. Ideally, there may be no overlap between the frequency responses of the first and second microphones. However, in practice, there may be a certain overlapping range, which may cause an interference range between the first sub-band sound signal and the second sub-band sound signal, and affect the quality of the first sub-band sound signal and the second sub-band sound signal. For example, the larger the overlapping range is, the larger the interference range may be, and the lower the quality of the first and second sub-band sound signals may be.

In some embodiments, the specific frequency point where the frequency responses of the first and second microphones intersect may be close to the half-power point of the frequency response of the first microphone and/or the half-power point of the frequency response of the second microphone. Taking FIG. 16A as an example, the frequency response 1610 and the frequency response 1620 may intersect at the higher half-power point f2 of the frequency response 1610. The intersection point may also be the lower half-power point of the frequency response 1620. As used herein, if a difference between power levels of the frequency point and the half-power point is not greater than a threshold (e.g., 2 dB), it may be determined that the frequency point is close to the half-power point. In this case, there may be few interference in the frequency responses of the first and second microphones, which may result in an appropriate overlapping range between the frequency responses of the first and second microphones. For example, if the half-power point is −3 dB, the threshold is −2 dB, and the frequency responses intersect at a frequency point at a power level greater than −5 dB and/or less than −1 dB, it may be determined that the overlapping range may be relatively small. In some embodiments, the center frequencies and/or bandwidths of the frequency response of the first and second microphones may be adjusted to obtain a narrower or appropriate overlapping range between the frequency responses of the first and second microphones to avoid overlapping between the frequency bands of the first and second sub-band sound signals.

Figure 17:
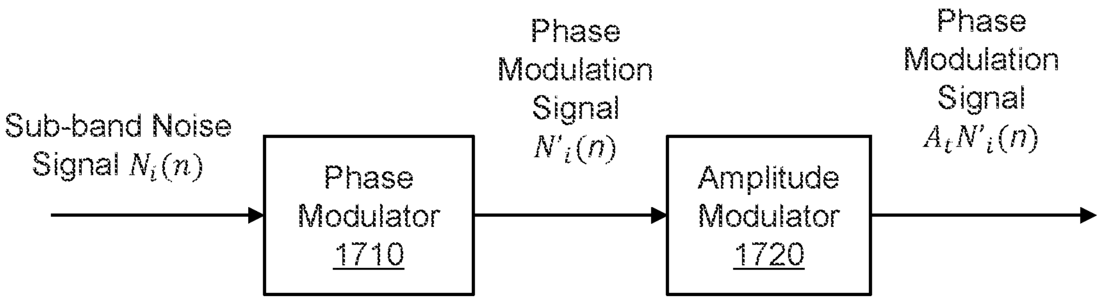
FIG. 17 is a schematic diagram illustrating an exemplary sub-band noise suppression sub-unit according to some embodiments of the present disclosure.

FIG. 17 is a schematic diagram illustrating an exemplary sub-band noise suppression sub-unit according to some embodiments of the present disclosure. The sub-band noise suppression sub-unit 1700 may be configured to receive a sub-band noise signal from a sub-band noise estimation sub-unit $N_i(n)$ and generate a sub-band noise correction signal $A_iN'_i(n)$ to reduce the sub-band noise signal $N_i(n)$. $A_i$ refers to an amplitude suppression coefficient related to the noise to be reduced.

Figure 18:
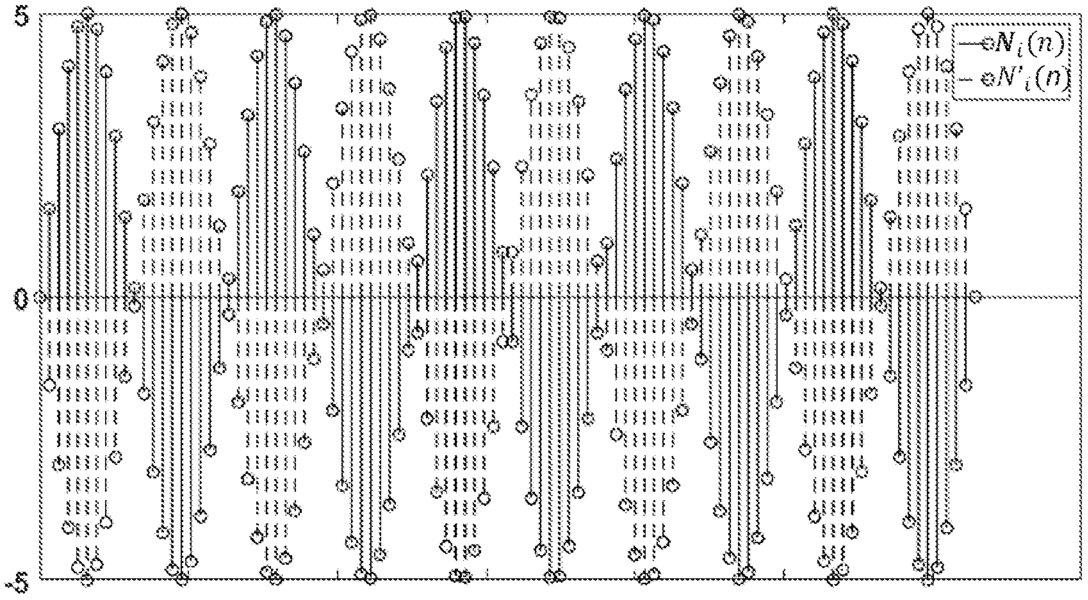
FIG. 18 is a schematic diagram illustrating phase modulation according to some embodiments of the present.

As shown in FIG. 17, the sub-band noise suppression sub-unit 1700 may include a phase modulator 1710 and an amplitude modulator 1720. The phase modulator 1710 may be configured to invert the sub-band noise signal $N_i(n)$ to generate a phase modulation signal $N'_i(n)$. For example, as shown in FIG. 18, the phase modulation signal $N'_i(n)$ may be the inverse of the sub-band noise signal $N_i(n)$. In some embodiments, the phase of the noise may shift during transmission from a position of the microphone 1512*a-i* to a position of the sub-band noise reduction unit 1522*a-i*. In some embodiments, the phase shift of the noise may be ignored. For example, if the noise transmits in the form of a plane wave in a single direction while transmitting from the position of the microphone 1512*a-i* to the position of the sub-band noise reduction unit 1522*a-i* (or a part thereof), and the phase shift during the transmission is less than a threshold, it may be determined that the phase of the noise has not shifted. At this time, the phase of the noise may be ignored when the phase modulation signal $N'_i(n)$ is generated. If the phase shift is greater than the threshold, it may be determined that the phase of the noise is shifted. In some embodiments, when the phase shift of the sub-band noise is ignored, the phase modulator 1710 may generate the modulation signal $N'_i(n)$ only by performing a phase inversion on the sub-band noise signal $N_i(n)$.

In some embodiments, when the phase shift of the sub-band noise is not ignored, the phase modulator 1710 needs to consider the phase shift of the sub-band noise when the modulation signal $N'_i(n)$ is generated. For example, the phase of the sub-band noise signal $N_i(n)$ may have a phase shift Δφ determined according to Equation (17) described below:

$$\Delta\varphi = \frac{2\pi f_0}{c}\Delta d, \tag{17}$$

where $f_0$ refers to the center frequency of the sub-band noise signal $N_i(n)$, and c refers to the speed of sound. If the noise is a near-field signal, Δd refers to a difference between a distance from the sound source to the microphone 1512*a-i* and a distance from the sound source to the sub-band noise reduction unit 1522*a-i* (or a part thereof). If the noise is a far-field signal, Δd may equal d cos θ, d refers to a distance between the microphone 1512*a-i* and the sub-band noise reduction unit 1522*a-i* (or a part thereof) and 0 represents an angle between the sound source and the microphone 1512*a-i* or the sound source and the sub-band noise reduction unit 1522*a-i* (or a part thereof).

To compensate for the phase shift Δφ, the phase modulator 1710 may perform the phase inversion and the phase compensation on the sub-band noise signal $N_i(n)$ to generate the phase modulation signal. In some embodiments, the phase modulator 1710 may include an all-pass filter. The filtering function of the all-pass filter may be expressed as |H(w)|, where w represents the angular frequency. In an ideal situation, an amplitude response of the all-pass filter |H(w)| may equal 1, and a phase response of the all-pass filter may equal the phase shift Δφ. The all-pass filter may delay the sub-band noise signal $N_i(n)$ by a delay time ΔT to perform the phase compensation. ΔT may be determined according to Equation (18) described below:

$$\Delta T = \frac{\Delta\varphi}{2\pi f_0} = \frac{\Delta d}{c}. \tag{18}$$

In this case, the phase modulator 1710 may perform the phase inversion and the phase compensation on the sub-band noise signal $N_i$ (n) to generate the phase modulation signal $N'_i(n)$.

The amplitude modulator 1720 may be configured to receive the phase modulation signal $N'_i(n)$ and generate the target modulation signal $A_t N'_i(n)$ by modulating the phase modulation signal $N'_i(n)$. In some embodiments, the noise may be suppressed during its transmission from the position of the microphone 1512*a-i* to the position of the sub-band noise reduction unit 1522*a-i* (or a part thereof). The amplitude suppression coefficient $A_t$ may be determined to measure the amplitude suppression of the noise during the transmission. The amplitude suppression coefficient $A_t$ may relate to one or more factors, including, for example, the material and/or structure of the acoustic channel element for sound transmission, the position of the microphone 1512*a-i* relative to the sub-band noise reduction unit 1522*a-i* (or a part thereof), or any combination thereof.

In some embodiments, the amplitude suppression coefficient $A_t$ may be default settings of the noise reduction assembly 1400, or previously determined through actual or simulated experiments. For example, the amplitude suppression coefficient $A_t$ may be determined by comparing an amplitude of the audio signal near the microphone 1512*a-i* (e.g., before entering an audio broadcasting device) with an amplitude after the audio signal is transmitted to the position of the sub-band noise reduction unit 1522*a-i*. In some alternative embodiments, the amplitude suppression of the noise may be ignored, for example, when the amplitude suppression during the noise transmission is less than a threshold and/or the amplitude suppression coefficient $A_t$ substantially equal 1. The phase modulation signal $N'_i(n)$ may be designated as a sub-band noise signal $N_i(n)$ of the sub-band noise correction signal (that is, the target modulation signal $\Delta_t N'_i(n)$).

In some embodiments, the sub-band noise suppression sub-unit 1700 may include a sub-band sound signal generator (not shown). The sub-band sound signal generator may generate a target sub-band sound signal $C_i(n)$ according to the sub-band noise correction signal $A_t N'_i(n)$ and the sub-band sound signal $S_i(n)$ and transmit thereof to the synthesis component 1430. The synthesis component 1430 may combine at least two target sub-band sound signals into the target signal S (n) according to Equation (19) described below:

$$S(n)=\Sigma_{i=1}^{m} C_i(n). \tag{19}$$

It should be noted that the above descriptions of FIGS. 17 and 18 are merely provided for the purposes of illustration, and are not intended to limit the scope of the present disclosure. For persons having ordinary skills in the art, multiple variations or modifications may be made under the teachings of the present disclosure. However, those variations and modifications do not depart from the scope of the present disclosure. For example, the sub-band noise suppression sub-unit 1700 may include one or more additional units, such as a signal synthesis unit. As another example, one or more components in the sub-band noise suppression sub-unit 1700 may be omitted, such as the amplitude modulator 1720.

It's noticeable that above statements are preferable embodiments and technical principles thereof. A person having ordinary skill in the art is easy to understand that this disclosure is not limited to the specific embodiments stated, and a person having ordinary skill in the art can make various obvious variations, adjustments, and substitutes within the protected scope of this disclosure. Therefore, although above embodiments state this disclosure in detail, this disclosure is not limited to the embodiments, and there can be many other equivalent embodiments within the scope of the present disclosure, and the protected scope of this disclosure is determined by following claims.

What is claimed is:

1. A bone conduction device comprising:

a housing;

a panel fitting human skin and passing vibrations to enable a user to hear sound;

a transducer residing inside the housing and configured to drive the panel to vibrate to generate the vibrations, the vibrations producing a first sound wave inside the housing, at least a portion of the housing vibrates along with the transducer to push air outside the housing to generate a second sound wave outside the housing;

at least one sound guiding hole located on the housing and configured to guide the first sound wave inside the housing through the at least one sound guiding hole to an outside of the housing, the first sound wave having a phase different from a phase of the second sound wave, the first sound wave interfering with the second sound wave in a target region, and the interference reducing a sound pressure level of the second sound wave in the target region; and a noise reduction assembly configured to receive a target sound and reduce noise of the target sound.

2. The bone conduction device of claim 1, wherein the noise reduction assembly includes a microphone array configured to collect sound signals, and the collected sound signals include the target sound and the noise.

3. The bone conduction device of claim 2, wherein the microphone array includes at least one low-frequency microphone and at least one high-frequency microphone, the at least one low-frequency microphone being configured to collect low-frequency signals of the collected sound signals, and the at least one high-frequency microphone being configured to collect high-frequency signals of the collected sound signals.

4. The bone conduction device of claim 3, wherein the at least one low-frequency microphone includes a pair of low-frequency microphones, and the at least one high-frequency microphone includes a pair of high-frequency microphones.

5. The bone conduction device of claim 2, wherein each microphone of the microphone array processes one of the collected sound signals into at least two sub-band sound signals.

6. The bone conduction device of claim 5, wherein each microphone of the microphone array corresponds to a filter, via which the one of the collected sound signals is processed into the at least two sub-band sound signals.

7. The bone conduction device of claim 5, wherein the at least two sub-band sound signals have narrower frequency bands than the one of the collected sound signals corresponding to the at least two sub-band sound signals.

8. The bone conduction device of claim 5, wherein the noise reduction assembly includes a noise reduction component configured to perform noise reduction on sub-band sound signals corresponding to the collected sound signals.

9. The bone conduction device of claim 8, wherein to perform noise reduction on sub-band sound signals corresponding to the collected sound signals, the noise reduction component is further configured to:

for each of the sub-band sound signals, generate a sub-band noise correction signal according to the sub-band sound signal; and generate a target sub-band sound signal based on the sub-band sound signal and the sub-band noise correction signal.

10. The bone conduction device of claim 9, wherein the noise reduction assembly further includes a synthesis component configured to generate a target signal by combining target sub-band sound signals corresponding to the sub-band sound signals.

11. The bone conduction device of claim 1, wherein the at least one sound guiding hole includes two sound guiding holes located on the housing, and the two sound guiding holes are arranged to generate at least two sound waves having different phases to reduce the sound pressure level of the second sound wave.

12. The bone conduction device of claim 1, wherein a location of the at least one sound guiding hole is determined based on at least one of: a vibration frequency of the transducer, a shape of the at least one sound guiding hole, the target region, or a frequency range within which the sound pressure level of the second sound wave is to be reduced.

13. The bone conduction device of claim 1, wherein the at least one sound guiding hole includes two sound guiding holes located on the housing, and the two sound guiding holes are arranged to generate sound waves having a same phase, one of the two sound guide holes generates a third sound wave of a first phase, the first phase is used to interfere with the second sound wave to reduce the sound pressure level of the second sound wave, the other of the two sound guide holes generates a fourth sound wave of a second phase, which is also used to interfere with the second sound wave to reduce the sound pressure level of the second sound wave, and the second chase is equal to the first phase.

14. The bone conduction device of claim 1, wherein at least a portion of the second sound wave whose sound pressure level is reduced is within a range of 1500 Hz to 3000 Hz.

15. The bone conduction device of claim 14, wherein the sound pressure level of the at least a portion of the second sound wave is reduced by more than 10 dB on average.

16. The bone conduction device of claim 1, wherein at least a portion of the second sound wave whose sound pressure level is reduced is within a range of 2000 Hz to 2500 Hz, and the sound pressure level of the at least a portion of the second sound wave is reduced by more than 20 dB on average.

17. The bone conduction device of claim 1, wherein the at least one sound guiding hole includes one sound guiding hole, different portions of the sound guiding hole are configured to generate sound waves having a same phase, one of the different portions of the sound guiding hole generates a third sound wave of a first phase, the first phase is used to interfere with the second sound wave to reduce the sound pressure level of the second sound wave, the other of the different portions of the sound quidding hole generates a fourth sound wave of a second phase, which is also used to interfere with the second sound wave to reduce the sound pressure level of the second sound wave, and the second phase is equal to the first phase.

18. The bone conduction device of claim 1, wherein the at least one sound guiding hole includes one sound guiding hole, different portions of the sound guiding hole are configured to generate sound waves having different phases to reduce the sound pressure level of the second sound wave.

19. The bone conduction device of claim 1, wherein the sound guiding hole includes a damping layer, the damping layer is configured to adjust the phase of the guided sound wave in the target region.

20. The bone conduction device of claim 1, wherein the housing is cylindrical with a sidewall and a bottom, the at least one sound guiding hole includes a plurality of sound guiding holes that are arranged along a circumference of the bottom.

* * * * *